United States Patent
Gorur Sheshagiri et al.

(10) Patent No.: US 12,236,631 B2
(45) Date of Patent: Feb. 25, 2025

(54) KEYPOINT DETECTION AND FEATURE DESCRIPTOR COMPUTATION

(71) Applicant: QUALCOMM Incorporated, San Diego, CA (US)

(72) Inventors: Pushkar Gorur Sheshagiri, Bengaluru (IN); Ajit Deepak Gupte, Bangalore (IN); Chiranjib Choudhuri, Bangalore (IN); Gerhard Reitmayr, Del Mar, CA (US); Youngmin Park, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 620 days.

(21) Appl. No.: 17/484,601

(22) Filed: Sep. 24, 2021

(65) Prior Publication Data

US 2023/0095621 A1     Mar. 30, 2023

(51) Int. Cl.
    *G06T 7/73*          (2017.01)
    *G06T 7/246*       (2017.01)
    *G06V 10/46*       (2022.01)
    *G06V 20/40*       (2022.01)

(52) U.S. Cl.
    CPC ............... *G06T 7/73* (2017.01); *G06T 7/246* (2017.01); *G06V 10/462* (2022.01); *G06V 20/46* (2022.01)

(58) Field of Classification Search
None
See application file for complete search history.

(56) References Cited

U.S. PATENT DOCUMENTS

| | | | | |
|---|---|---|---|---|
| 10,571,925 | B1 * | 2/2020 | Zhang | G05D 1/0253 |
| 2010/0195914 | A1 * | 8/2010 | Isard | G06V 10/751 |
| | | | | 707/E17.014 |
| 2011/0170780 | A1 * | 7/2011 | Vaddadi | G06V 10/462 |
| | | | | 382/190 |
| 2011/0255781 | A1 * | 10/2011 | Hamsici | G06V 10/462 |
| | | | | 382/170 |
| 2013/0272548 | A1 * | 10/2013 | Visser | G06V 10/25 |
| | | | | 382/103 |
| 2013/0308860 | A1 * | 11/2013 | Mainali | G06V 10/757 |
| | | | | 382/199 |

(Continued)

OTHER PUBLICATIONS

Bretzner et al. "Feature Tracking with Automatic Selection of Spatial Scales", Computer Vision and Image Understanding vol. 71, No. 3, September, pp. 385-392, 1998 (Year: 1998).*

(Continued)

*Primary Examiner* — Randolph I Chu
(74) *Attorney, Agent, or Firm* — Polsinelli/Qualcomm

(57) ABSTRACT

Systems and techniques are described herein for processing frames. The systems and techniques can be implemented by various types of systems, such as by an extended reality (XR) system or device. In some cases, a process can include obtaining feature information associated with a feature in a current frame, wherein the feature information is based on one or more previous frames; determining an estimated pose of the apparatus associated with the current frame; obtaining a distance associated with the feature in the current frame; and determining an estimated scale of the feature in the current frame based on the feature information associated with the feature, the estimated pose, and the distance associated with the feature.

27 Claims, 19 Drawing Sheets

(56) References Cited

U.S. PATENT DOCUMENTS

2015/0049943 A1* 2/2015 Hamsici ............ G06F 18/2415
382/218
2023/0095621 A1* 3/2023 Gorur Sheshagiri ... G06T 7/246
382/103

OTHER PUBLICATIONS

Bretzner L., et al., "Feature Tracking with Automatic Selection of Spatial Scales", Computer Vision and Image Understanding, Academic Press, US, vol. 71, No. 3, Sep. 1, 1998, pp. 385-392, XP000783163, ISSN: 1077-3142, DOI: 10.1006/CVIU.1998.0650, pp. 387-388.

Chandaria J., et al., "Realtime Camera Tracking in the MATRIS Project", SMPTE—Motion Imaging Journal, Society of Motion Picture and Television Engineers, White Plains, NY, US, vol. 116, No. 7/08, Jul. 1, 2007, pp. 266-271, XP001506022, ISSN: 0036-1682, pp. 267-269, figures 1, 4.

Chiu H-K., et al., "Probabilistic 3D Multi-Object Tracking for Autonomous Driving", arxiv.org, Cornell University Library, 201 Olin Library Cornell University Ithaca, NY 14853, Jan. 16, 2020, pp. 1-8, XP081579951, Abstract, Section 3.2.

International Search Report and Written Opinion—PCT/US2022/075398—ISA/EPO—Dec. 14, 2022.

Li P., et al., "Monocular Visual-Inertial State Estimation for Mobile Augmented Reality", 2017 IEEE International Symposium on Mixed and Augmented Reality (ISMAR), IEEE, Oct. 9, 2017, pp. 11-21, XP033262489, DOI: 10.1109/ISMAR.2017.18 [retrieved on Nov. 20, 2017] Abstract, section 3.

Li X., et al., "Object Detection in the Context of Mobile Augmented Reality", arxiv.org, Cornell University Library, 201 Olin Library Cornell University Ithaca, NY 14853, Aug. 15, 2020, pp. 156-163, XP081742155, Section 3.2, "Scale-Based Filtering", figure 2.

Nutzi G., et al., "Fusion of IMU and Vision for Absolute Scale Estimation in Monocular SLAM", Journal of Intelligent and Robotic Systems, vol. 61, No. 1-4, Nov. 12, 2010, pp. 287-299, XP055094343, ISSN: 0921-0296, DOI:10.1007/s10846-010-9490-z, section 5, abstract, figure 1, pp. 294-295.

* cited by examiner

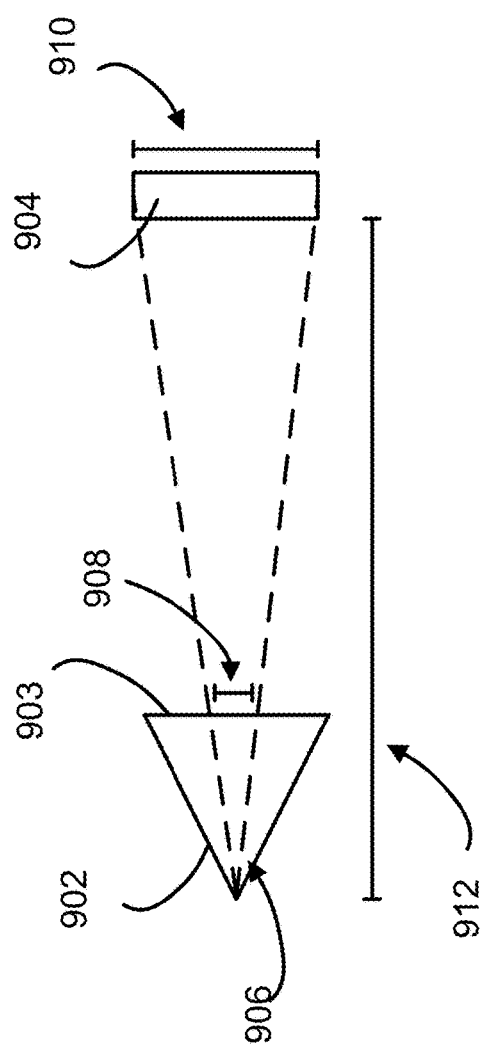
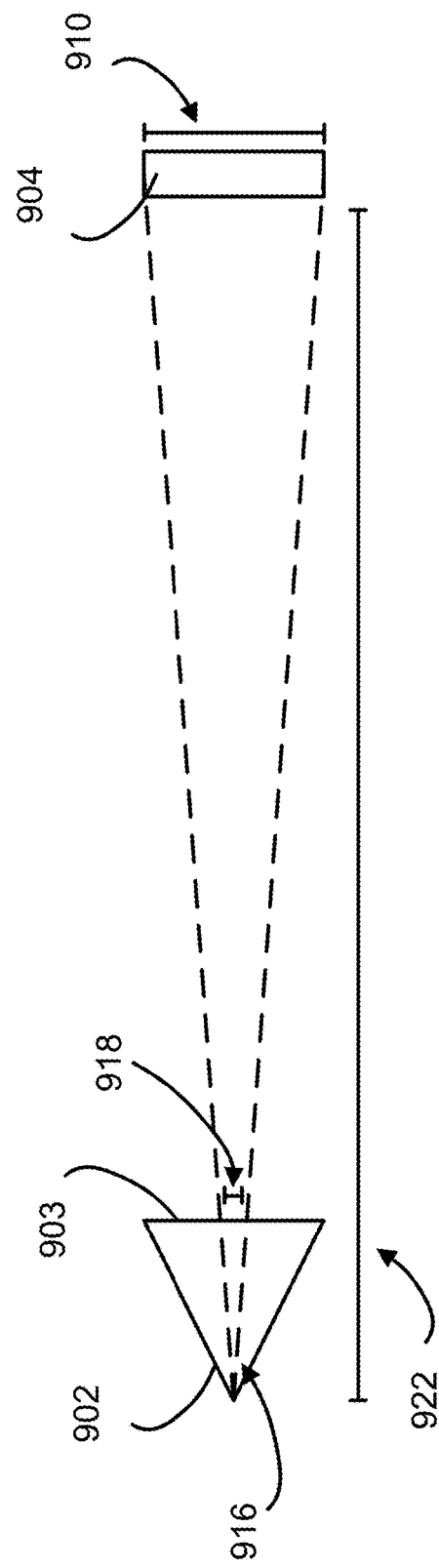
FIG. 9A
FIG. 9B

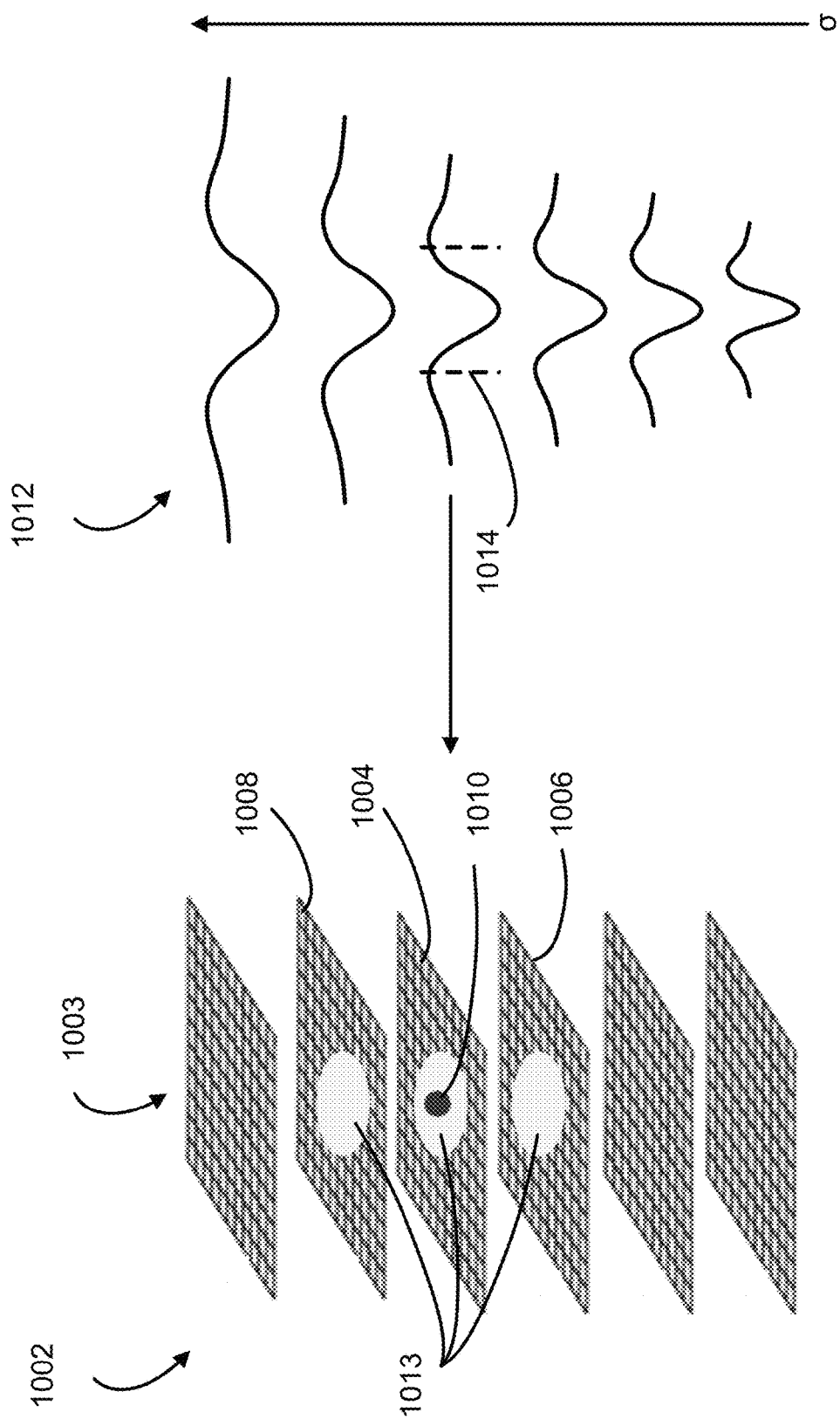

KEYPOINT DETECTION AND FEATURE DESCRIPTOR COMPUTATION

FIELD

This application is related to image processing. For example, aspects of the application relate to systems and techniques of detecting features and keypoints for machine or computer vision.

BACKGROUND

Degrees of freedom (DoF) refer to the number of basic ways a rigid object can move through three-dimensional (3D) space. In some examples, six different DoF can be tracked. The six DoF include three translational DoF corresponding to translational movement along three perpendicular axes, which can be referred to as x, y, and z axes. The six DoF include three rotational DoF corresponding to rotational movement around the three axes, which can be referred to as pitch, yaw, and roll. Some extended reality (XR) devices, such as virtual reality (VR) or augmented reality (AR) headsets, can track some or all of these degrees of freedom. For instance, a 3DoF XR headset typically tracks the three rotational DoF, and can therefore track whether a user turns and/or tilts their head. A 6DoF XR headset tracks all six DoF, and thus also tracks a user's translational movements.

Electronic devices (e.g., extended reality (XR) devices, mobile devices, etc.) can use powerful processors to perform feature analysis (e.g., extraction, tracking, etc.) and other complex functions quickly enough to display an output based on those functions to their users. An example complex function involves detecting and correlating features between successive frames while the size (or scale) of the features changes based on the pose of the electronic device (e.g., XR device, etc.). One technique for detecting features with changing scale is referred to as a scale space search. In a scale space search, many different filtered versions of a frame corresponding to different scales are searched for a peak response to identify features. In some implementations, the computational effort associated with searching through all of the different scales for each frame incurs a majority of the computational cost of performing feature analysis.

SUMMARY

Systems and techniques are described herein for processing frames. According to one illustrative example, an apparatus for processing one or more frames is provided that includes a memory configured to store at least one image and one or more processors (e.g., implemented in circuitry) and coupled to the memory. The one or more processors are configured to and can: obtain feature information associated with a feature in a current frame, wherein the feature information is based on one or more previous frames; determine an estimated pose of the apparatus associated with the current frame; obtain a distance associated with the feature in the current frame; and determine an estimated scale of the feature in the current frame based on the feature information associated with the feature, the estimated pose, and the distance associated with the feature.

In another example, a method of processing one or more frames is provided. The method includes: obtaining, by a computing device, feature information associated with a feature in a current frame, wherein the feature information is based on one or more previous frames; determining an estimated pose of the computing device associated with the current frame; obtaining, by the computing device, a distance associated with the feature in the current frame; and determining, by the computing device, an estimated scale of the feature in the current frame based on the feature information associated with the feature, the estimated pose, and the distance associated with the feature.

In another example, a non-transitory computer-readable medium of a computing device is provided that has stored thereon instructions that, when executed by one or more processors, cause the one or more processors to: obtain feature information associated with a feature in a current frame, wherein the feature information is based on one or more previous frames; determine an estimated pose of the computing device associated with the current frame; obtain a distance associated with the feature in the current frame; and determine an estimated scale of the feature in the current frame based on the feature information associated with the feature, the estimated pose, and the distance associated with the feature.

In another example, an apparatus for processing one or more frames is provided. The apparatus includes: means for obtaining feature information associated with a feature in a current frame, wherein the feature information is based on one or more previous frames; means for determining an estimated pose of the apparatus associated with the current frame; means for obtaining a distance associated with the feature in the current frame; and means for determining an estimated scale of the feature in the current frame based on the feature information associated with the feature, the estimated pose, and the distance measurement associated with the feature.

In some aspects, the method, apparatuses, and computer-readable medium described above can include: determining an estimated location of the feature in the current frame based on a location of the feature in the one or more previous frames and the estimated pose associated with the current frame; and obtaining the distance associated with the current frame at the estimated location of the feature.

In some aspects, to determine the estimated location of the feature in the current frame based on the estimated pose, the method, apparatuses, and computer-readable medium described above can include: obtaining motion information from a motion sensor; and based on the motion information, updating a previously determined pose. In some aspects, the motion sensor comprises an inertial measurement unit. In some aspects, the apparatus (or the computing device) include the motion sensor.

In some aspects, the feature information comprises a metric scale of the feature.

In some aspects, the feature information comprises a previous distance and a previous feature scale of the feature associated with the one or more previous frames. In some cases, the one or more previous frames comprises a keyframe.

In some aspects, the method, apparatuses, and computer-readable medium described above can include: determining a location of the feature in the current frame and a calculated scale of the feature in the current frame based on matching the feature in the current frame with a feature associated with the one or more previous frames.

In some aspects, the method, apparatuses, and computer-readable medium described above can include: determining a location of the feature in the current frame and a calculated scale of the feature in the current frame based on the estimated scale of the feature at least in part by searching for the feature in a nearest scale space layer of a scale space, wherein a scale of the nearest scale space layer corresponds to the estimated scale of the feature.

In some aspects, the scale space comprises a plurality of filtered arrays based on the current frame. In some cases, each of the plurality of filtered arrays based on the current frame is associated with a different feature scale.

In some aspects, the scale space comprises a plurality of difference of gaussian (DoG) arrays associated with different feature scales, and the plurality of DOG arrays comprises the nearest scale space layer of the scale space.

In some aspects, the scale space comprises a plurality of Laplacian of Gaussian arrays associated with different feature scales.

In some aspects, the method, apparatuses, and computer-readable medium described above can include searching for the feature in one or more scale space layers neighboring the nearest scale space layer of the scale space.

In some aspects, the scale space comprises N scale space layers. In some cases, the method, apparatuses, and computer-readable medium described above can include searching for the feature in less than N layers of the scale space.

According to another illustrative example, an apparatus for processing one or more frames is provided that includes a memory configured to store at least one image and one or more processors (e.g., implemented in circuitry) and coupled to the memory. The one or more processors are configured to and can: obtain feature information associated with a feature in a current frame, wherein the feature information is based on one or more previous frames; determine an estimated pose of the apparatus associated with the current frame; obtain a distance associated with the feature in the current frame; and determine an estimated dominant orientation of the feature in the current frame based on the feature information associated with the feature, the estimated pose, and the distance associated with the feature.

In another example, a method of processing one or more frames is provided. The method includes: obtaining, by a computing device, feature information associated with a feature in a current frame, wherein the feature information is based on one or more previous frames; determining an estimated pose of the computing device associated with the current frame; obtaining, by the computing device, a distance associated with the feature in the current frame; and determining, by the computing device, an estimated dominant orientation of the feature in the current frame based on the feature information associated with the feature, the estimated pose, and the distance associated with the feature.

In another example, a non-transitory computer-readable medium of a computing device is provided that has stored thereon instructions that, when executed by one or more processors, cause the one or more processors to: obtain feature information associated with a feature in a current frame, wherein the feature information is based on one or more previous frames; determine an estimated pose of the computing device associated with the current frame; obtain a distance associated with the feature in the current frame; and determine an estimated dominant orientation of the feature in the current frame based on the feature information associated with the feature, the estimated pose, and the distance associated with the feature.

In another example, an apparatus for processing one or more frames is provided. The apparatus includes: means for obtaining feature information associated with a feature in a current frame, wherein the feature information is based on one or more previous frames; means for determining an estimated pose of the apparatus associated with the current frame; means for obtaining a distance associated with the feature in the current frame; and means for determining an estimated dominant orientation of the feature in the current frame based on the feature information associated with the feature, the estimated pose, and the distance associated with the feature.

In some aspects, the feature information includes a previous dominant orientation associated with the feature based on the one or more previous frames. In some cases, to determine the estimated dominant orientation of the feature in the current frame, the method, apparatuses, and computer-readable medium described above can include: determining an estimated transformation between a pose associated with the one or more previous frames and the estimated pose associated with the current frame; and apply the estimated transformation to the previous dominant orientation to determine the estimated dominant orientation of the feature in the current frame.

In some aspects, one or more of the apparatuses described above is, is part of, or includes a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle (e.g., a computing device of a vehicle), or other device. In some aspects, an apparatus includes a camera or multiple cameras for capturing one or more images. In some aspects, the apparatus includes a display for displaying one or more images, notifications, and/or other displayable data. In some aspects, the apparatus can include one or more sensors. In some cases, the one or more sensors can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 9A and FIG. 9B are diagrams illustrating the relationship between distance of an object from a camera and corresponding size of the object in a frame, in accordance with some examples;

FIG. 10A and FIG. 10B illustrate an example of a targeted scale space search, in accordance with some examples;

DETAILED DESCRIPTION

Figure 1:
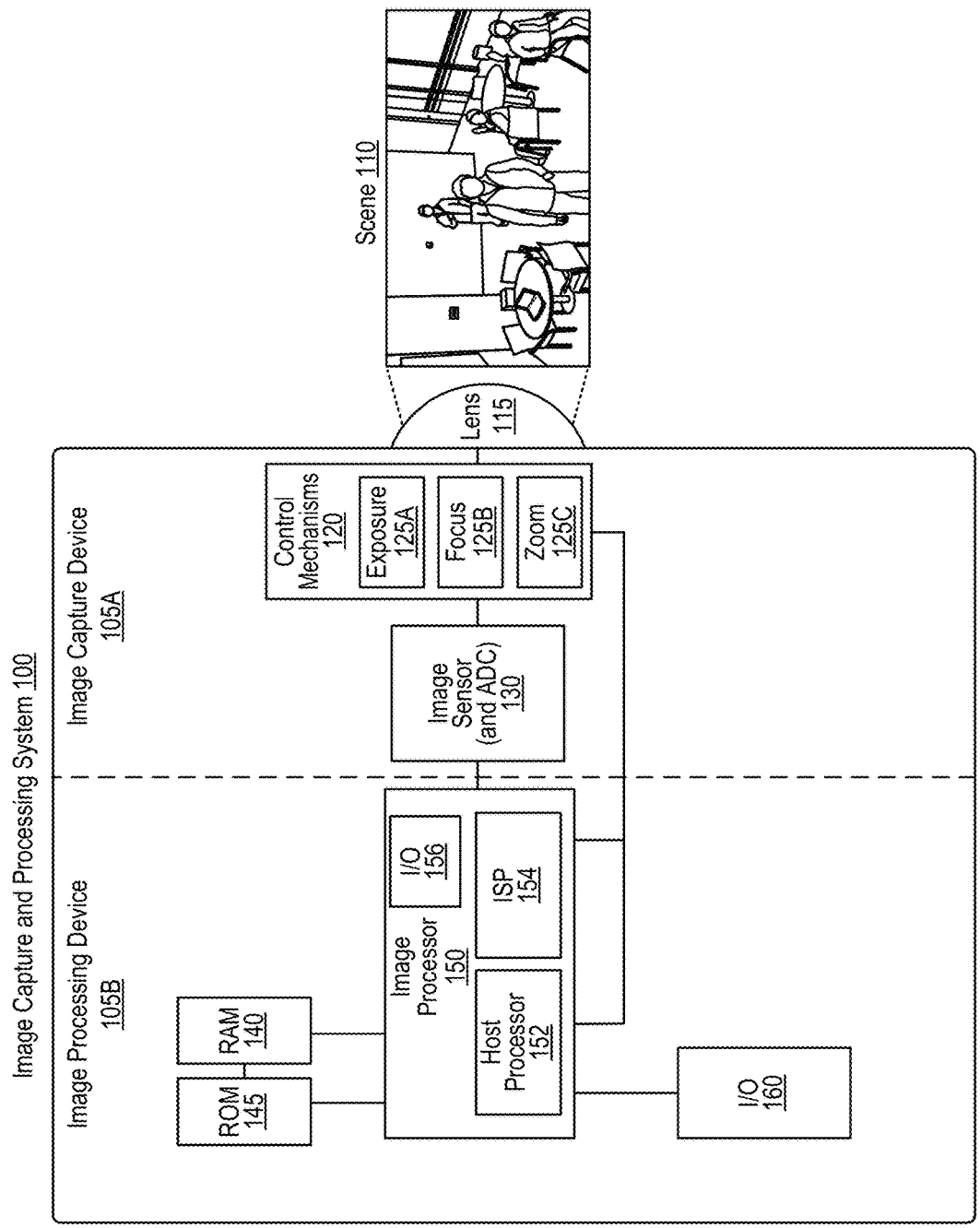
FIG. 1 is a block diagram illustrating an architecture of an image capture and processing device, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the scope of the application as set forth in the appended claims.

An image capture device (e.g., a camera) is a device that receives light and captures image frames, such as still images or video frames, using an image sensor. The terms "image," "image frame," "video frame," and "frame" are used interchangeably herein. As used herein, the term current frame can refer to a most recently captured frame in the sequence of frames. The terms previous frame, previously detected frame, and previously captured frame can be used interchangeably herein and can refer to one or more frames occurring prior to the current frame in a sequence of frames. An image capture device typically includes at least one lens that receives light from a scene and bends the light toward an image sensor of the image capture device. The light received by the lens passes through an aperture controlled by one or more control mechanisms and is received by the image sensor. The one or more control mechanisms can control exposure, focus, and/or zoom based on information from the image sensor and/or based on information from an image processor (e.g., a host or application process and/or an image signal processor). In some examples, the one or more control mechanisms include a motor or other control mechanism that moves a lens of an image capture device to a target lens position.

Degrees of freedom (DoF) refer to the number of basic ways a rigid object can move through three-dimensional (3D) space. In some cases, six different DoF can be tracked. The six degrees of freedom include three translational degrees of freedom corresponding to translational movement along three perpendicular axes. The three axes can be referred to as x, y, and z axes. The six degrees of freedom include three rotational degrees of freedom corresponding to rotational movement around the three axes, which can be referred to as pitch, yaw, and roll.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. As used herein, the terms XR system and XR device are used interchangeably. Examples of XR systems or devices include head-mounted display's (HMDs), smart glasses, among others. In some cases, an XR system can track parts of the user (e.g., a hand and/or fingertips of a user) to allow the user to interact with items of virtual content.

Visual simultaneous localization and mapping (VSLAM) is a computational geometry technique used in devices with cameras, such as robots, head-mounted displays (HMDs), mobile handsets, and autonomous vehicles. In VSLAM, a device can construct and update a map of an unknown environment based on frames captured by the device's camera. The device can keep track of the device's pose (e.g., a pose of an image sensor of the device, such as a camera pose) within the environment (e.g., location and/or orientation) as the device updates the map. For example, the device can be activated in a particular room of a building and can move throughout the interior of the building, capturing frames. The device can map the environment, and keep track of its location in the environment, based on tracking where different objects in the environment appear in different frames.

In the context of systems that track movement through an environment (e.g., XR systems, robotics systems, vehicles such as automated vehicles, VSLAM systems, among others), degrees of freedom can refer to which of the six degrees of freedom the system is capable of tracking. 3DoF systems generally track the three rotational DoF-pitch, yaw, and roll.

A 3DoF headset, for instance, can track the user of the headset turning their head left or right, tilting their head up or down, and/or tilting their head to the left or right. 6DoF systems can track the three translational DoF as well as the three rotational DoF. Thus, a 6DoF headset, for instance, and can track the user moving forward, backward, laterally, and/or vertically in addition to tracking the three rotational DoF.

Systems that track movement through an environment, such as XR systems and/or VSLAM systems, generally include powerful processors. These powerful processors can be used to perform complex operations quickly enough to display an up-to-date output based on those operations to the users of these systems. Such complex operations can relate to feature tracking, 6DoF tracking, VSLAM, rendering virtual objects to overlay over the user's environment in XR, animating the virtual objects, and/or other operations discussed herein. Powerful processors typically draw power at a high rate. Sending large quantities of data to powerful processors typically draws power at a high rate, and such systems often capture large quantities of sensor data (e.g., frames, location data, and/or other sensor data) per second. Headsets and other portable devices typically have small batteries so as not to be uncomfortably heavy to users. Thus, typical XR headsets either must be plugged into an external power source, are uncomfortably heavy due to inclusion of large batteries, or have very short battery lives.

As described in more detail herein, systems, apparatuses, methods (also referred to as processes, and computer-readable media (collectively referred to herein as "systems and techniques") are described herein for reducing computational effort (e.g., reducing the number of calculations required for a specific task) of frame processing operations. The frame processing operations can support 3DoF tracking, 6DoF tracking, VSLAM, simultaneous localization and mapping (SLAM), XR (e.g., AR, VR, and/or MR), any combination thereof, and/or other technique. Accordingly, although examples of the disclosure may specifically reference operations performed by an XR system (e.g., XR system 200 shown in FIG. 2) or a SLAM system (e.g., SLAM system 300 shown in FIG. 3), it should be understood that examples of the disclosure can be applied in the context of any system that supports 3DoF tracking, 6DoF tracking, VSLAM, simultaneous localization and mapping (SLAM), any combination thereof, and/or other technique without departing from the scope of the disclosure.

For example, after performing an initial search for features in a frame (e.g., a keyframe) using a full scale space search, the metric scale of detected features can be determined based on the pixel scale of the features in the frame. In some cases, the metric scale of the features can be stored in a map of the environment (e.g., from a mapper included in a SLAM system). In some examples, a targeted scale space search can be used to detect the same feature in a current frame based on the metric size of the feature and distance information associated with the feature in the current frame. In some cases, the pixel scale of a feature (also referred to as size, scale, feature size, feature scale, blob size, and/or blob scale herein) may correspond with a particular layer within a scale space that provides a maximum response for the feature. In some cases, the layers of a scale space can include multiple arrays generated by applying filters to a frame and/or downscaled or subsampled versions of the frame. In one illustrative example, the layers of a scale space can include multiple differences of gaussian (DoG) (also referred to as DoG arrays herein), where each DoG array is associated with a different feature scale. In some cases, each DoG array can be calculated by subtracting two frames filtered with Gaussian filters having different variance values $\sigma^2$. As used herein, a frame can be filtered with Gaussian filters having different variance values $\sigma^2$ and the resulting filtered frames can be referred to as filtered versions of the frame. In another illustrative example, the scale space can include frames filtered with Laplacian of Gaussian (LoG) filters having different variance values $\sigma^2$. In some cases, the feature scale of the object can be determined based on which layer of the scale space (e.g., which DoG array or LoG filtered frame) contains a maximum or minimum response for the feature.

Many XR devices or systems capture depth information in addition to capturing frames. In some cases, the depth information can be captured (e.g., using a depth sensor) simultaneously or in close temporal proximity (e.g., within 1 ms, within 2 ms, within 10 ms, or within any other desired time threshold) with the frames. In some cases, an XR device or system can determine or estimate depth by performing triangulation or other technique based on map points. For instance, the XR device or system can perform triangulation or other similar technique using the map points. Based on the triangulation, the XR device or system can estimate the depth. In some examples, using the depth information and the blob size of a feature, the metric scale of the feature (e.g., the size of the feature in millimeter (mm), centimeter (cm), or meter (m) can be calculated and stored by a mapper in an environment map. For example, the metric scale of the feature can be stored within one or more keyframes included in the map.

In some examples, an XR system can obtain feature information for features within the environment occupied by the XR system. In some cases, a tracker included in the XR system can receive the feature information from a mapper included in the XR system. For example, the tracker may receive feature coordinates, feature descriptors, feature dominant orientations (also referred to as dominant orientation vectors herein), feature metric scales, other feature information, or any combination thereof from the mapper. In some cases, the tracker can receive information for a slice of the feature map. As used herein, a slice can refer to a relevant portion of the environment in the vicinity of the XR system based on the XR system's current pose. In some cases, the slice can include feature information for regions of the environment likely to be captured by the XR system camera. For example, the slice can include feature information associated with features in a room or a portion of a room occupied by the XR system. In some cases, the slice can also include information about the orientation of the feature, such as a normal vector to a plane defined by the center point of the feature, and the dominant orientation vector calculated for the feature.

In some cases, the metric scale associated with the feature can be used to reduce the complexity of detecting previously mapped features. In some cases, using the metric scale associated with the features, an estimated location of the features based on an estimated current pose of the XR system (e.g., based on a camera pose of an image sensor or camera of the XR system), and distance information captured in addition to capturing the frame, the XR system can determine an estimated blob size for each of the features that have metric scale information stored in the map. In some cases, the XR system can perform a targeted search of a scale space based on the estimated blob size. For example, in some cases, the XR system can search for the feature in the scale that most closely corresponds to the estimated blob size, also referred to as the nearest scale herein. In some cases, the XR system can search for the feature in the nearest scale as well as neighboring scales above and below the nearest scale. In some cases, searching within the neighboring scales can compensate for errors in the estimated pose, estimated feature locations, distance (e.g., calculated distances such as based on triangulation or distance measurements), metric scale information, or any combination thereof. In some cases, searching for features within a limited region of the scale space can significantly reduce the computational effort for feature detection when compared with performing a full scale space search for every feature in every frame.

In some cases, the metric scale information associated with features can also be used to eliminate features stored in a map. In some cases, using the size of a feature in pixels (as opposed to the metric scale) as a basis for removing features can erroneously remove features associated with objects that are close to the camera. In some aspects, features that extend over large physical spaces can include multiple objects, which can result in poor matching as the pose of the SLAM system changes. In some cases, features that exceed a particular blob size on the metric scale, such as 10 cm, 20 cm, 50 cm, or any other selected size can be removed from the map and/or ignored during pose calculation during tracking.

In some implementations, the dominant orientation can be used to provide rotational invariance of a feature descriptor used to describe the feature. For example, by calculating the feature descriptor relative to the dominant orientation of a feature, the feature descriptor can be consistent between frames even if the feature rotates between successive frames. In some cases, the dominant orientation for each feature can be calculated for every newly captured frame. In some implementations, calculating the dominant orientation can include determining edge gradients in a neighborhood (e.g., a patch of nearby pixels) around the center of the feature. In some implementations, the determined edge gradients can be binned in a histogram, and the highest bin or the highest one or more bins if there is not a single clearly dominant orientation can be designated as the dominant orientation or orientations.

In some cases, feature information stored in the map can also be used for estimating the dominant orientation of a feature in a subsequent frame without having to re-calculate gradients in the neighborhood around the center of the feature and/or bin those gradients in a histogram. For example, if the feature information stored in the map includes a normal vector calculated from the feature's center point and dominant orientation. In some cases, the normal vector pointing direction for each feature in a newly captured frame can be estimated based on the estimated pose associated with the newly captured frame. In some cases, the dominant orientation for a feature can be reprojected into the newly captured frame from the estimated normal pointing vector of the feature. In some implementations, the XR system can determine feature descriptors relative to the reprojected dominant direction.

Various aspects of the application will be described with respect to the figures. FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. A lens 115 of the image capture and processing system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the one or more control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The one or more focus control mechanisms 125B of the one or more control mechanisms 120 can obtain a focus setting. In some examples, the one or more focus control mechanisms 125B store the focus setting in a memory register. Based on the focus setting, the one or more focus control mechanisms 125B can adjust the position of the lens 115 relative to the position of the image sensor 130. For example, based on the focus setting, the one or more focus control mechanisms 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the one or more control mechanism 120, the image sensor 130, and/or the image processor 150. The focus setting may be referred to as an image capture setting and/or an image processing setting.

The one or more exposure control mechanisms 125A of the one or more control mechanisms 120 can obtain an exposure setting. In some cases, the one or more exposure control mechanisms 125A stores the exposure setting in a memory register. Based on this exposure setting, the one or more exposure control mechanisms 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The one or more zoom control mechanisms 125C of the one or more control mechanisms 120 can obtain a zoom setting. In some examples, the one or more zoom control mechanisms 125C stores the zoom setting in a memory register. Based on the zoom setting, the one or more zoom control mechanisms 125C can control a focal length of an assembly of lens elements (lens assembly) that includes the lens 115 and one or more additional lenses. For example, the one or more zoom control mechanisms 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the one or more zoom control mechanisms 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 130) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the one or more control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1610 discussed with respect to the computing system 1600. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1620, read-only memory (ROM) 145/1625, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1635, any other input devices 1645, or some combination thereof. In some cases, a caption may be input into the image processing device 105B through a physical keyboard or keypad of the I/O devices 160, or through a virtual keyboard or keypad of a touchscreen of the I/O devices 160. The I/O ports 156 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O ports 156 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, the one or more control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
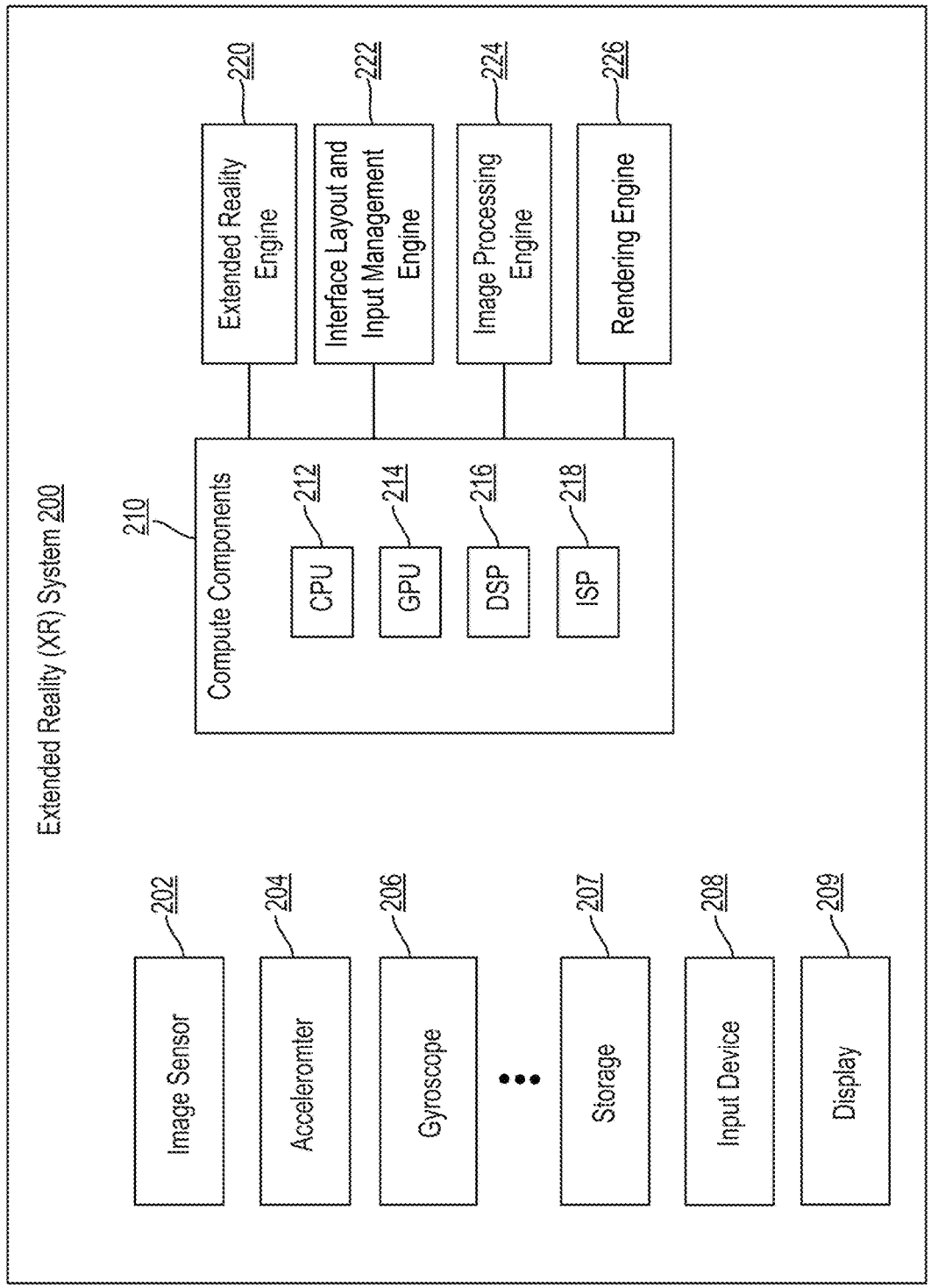
FIG. 2 is a block diagram illustrating an architecture of an example extended reality (XR) system, in accordance with some examples.

In some examples, the extended reality (XR) system 200 of FIG. 2 can include the image capture and processing system 100, the image capture device 105A, the image processing device 105B, or a combination thereof. In some examples, the simultaneous localization and mapping (SLAM) system 300 of FIG. 3 can include the image capture and processing system 100, the image capture device 105A, the image processing device 105B, or a combination thereof.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an interface layout and input management engine 222, an image processing engine 224, and a rendering engine 226. It should be noted that the components 202-126 shown in FIG. 2 are non-limiting examples provided for illustrative and explanation purposes, and other examples can include more, less, or different components than those shown in FIG. 2. For example, in some cases, the XR system 200 can include one or more other sensors (e.g., one or more inertial measurement units (IMUs), radars, light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, any other input device 1645 discussed herein, or any combination thereof. In some cases, the image sensor 202 can capture images that can be processed for interpreting gesture commands.

In some implementations, the one or more image sensors 202, the accelerometer 204, the gyroscope 206, storage 207, compute components 210, XR engine 220, interface layout and input management engine 222, image processing engine 224, and rendering engine 226 can be part of the same computing device. For example, in some cases, the one or more image sensors 202, the accelerometer 204, the gyroscope 206, storage 207, compute components 210, XR engine 220, interface layout and input management engine 222, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, interface layout and input management engine 222, image processing engine 224, and rendering engine 226 can be part of two or more separate computing devices. For example, in some cases, some of the components 202-126 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the interface layout and input management engine 222, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the interface layout and input management engine 222, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the interface layout and input management engine 222, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the interface layout and input management engine 222, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the object). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/ physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose (also referred to as a camera pose) of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown in FIG. 2), such as the SLAM system 300 of FIG. 3. SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or a combination thereof.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
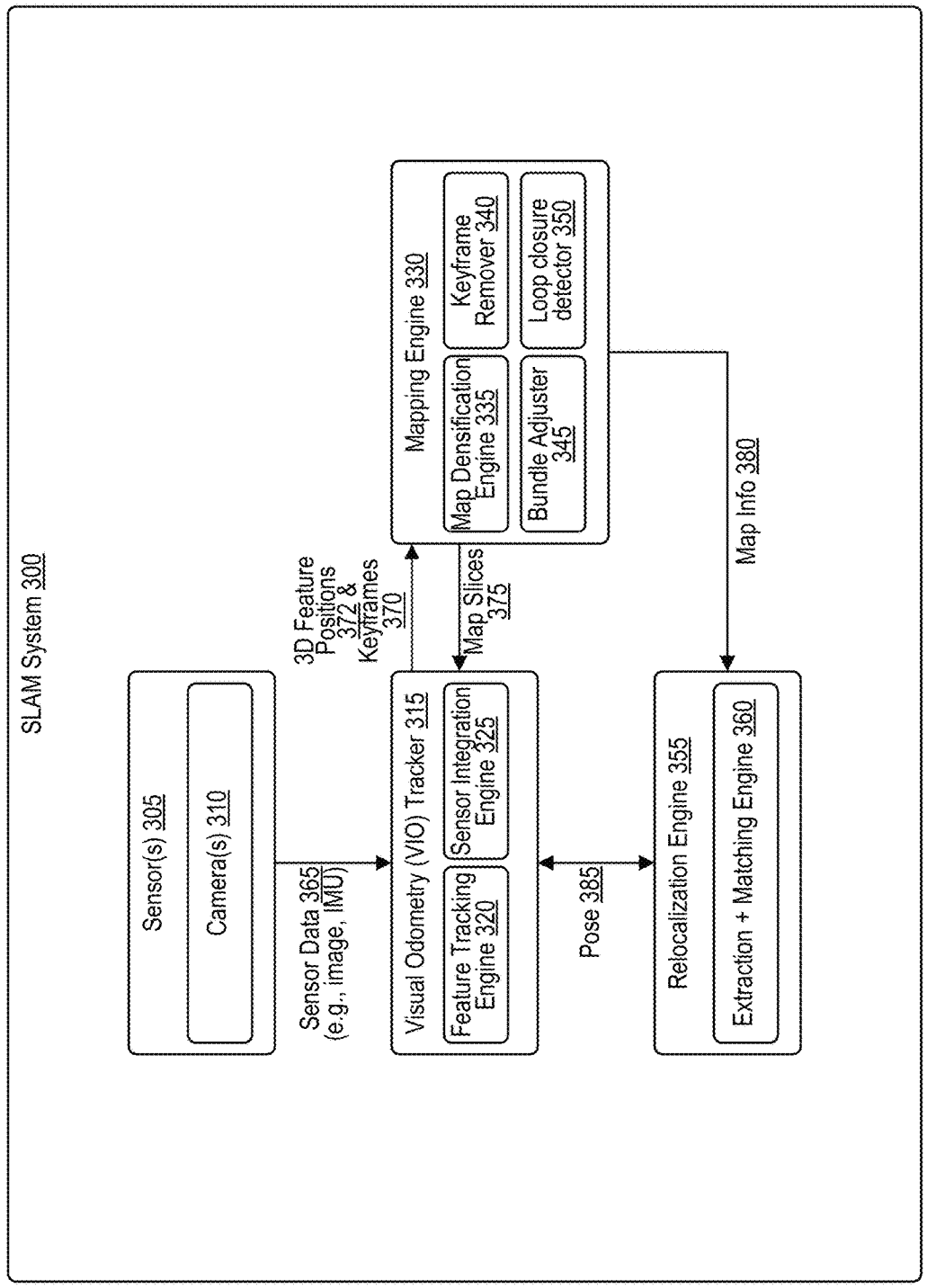
FIG. 3 is a block diagram illustrating an architecture of a simultaneous localization and mapping (SLAM) device, in accordance with some examples.

FIG. 3 is a block diagram illustrating an architecture of a simultaneous localization and mapping (SLAM) system 300. In some examples, the SLAM system 300 can be, or can include, an extended reality (XR) system, such as the XR system 200 of FIG. 2. In some examples, the SLAM system 300 can be a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

The SLAM system 300 of FIG. 3 includes, or is coupled to, each of one or more sensors 305. The one or more sensors 305 can include one or more cameras 310. Each of the one or more cameras 310 may include an image capture device 105A, an image processing device 105B, an image capture and processing system 100, another type of camera, or a combination thereof. Each of the one or more cameras 310 may be responsive to light from a particular spectrum of light. The spectrum of light may be a subset of the electromagnetic (EM) spectrum. For example, each of the one or more cameras 310 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof.

The one or more sensors 305 can include one or more other types of sensors other than cameras 310, such as one or more of each of: accelerometers, gyroscopes, magnetometers, inertial measurement units (IMUs), altimeters, barometers, thermometers, radio detection and ranging (RADAR) sensors, light detection and ranging (LIDAR) sensors, sound navigation and ranging (SONAR) sensors, sound detection and ranging (SODAR) sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 305 can include any combination of sensors of the XR system 200 of FIG. 2.

The SLAM system 300 of FIG. 3 includes a visual-inertial odometry (VIO) tracker 315. The term visual-inertial odometry may also be referred to herein as visual odometry. The VIO tracker 315 receives sensor data 365 from the one or more sensors 305. For instance, the sensor data 365 can include one or more images captured by the one or more cameras 310. The sensor data 365 can include other types of sensor data from the one or more sensors 305, such as data from any of the types of sensors 305 listed herein. For instance, the sensor data 365 can include inertial measurement unit (IMU) data from one or more IMUs of the one or more sensors 305.

Upon receipt of the sensor data 365 from the one or more sensors 305, the VIO tracker 315 performs feature detection, extraction, and/or tracking using a feature tracking engine 320 of the VIO tracker 315. For instance, where the sensor data 365 includes one or more images captured by the one or more cameras 310 of the SLAM system 300, the VIO tracker 315 can identify, detect, and/or extract features in each image. Features may include visually distinctive points in an image, such as portions of the image depicting edges and/or corners. The VIO tracker 315 can receive sensor data 365 periodically and/or continually from the one or more sensors 305, for instance by continuing to receive more images from the one or more cameras 310 as the one or more cameras 310 capture a video, where the images are video frames of the video. The VIO tracker 315 can generate descriptors for the features. Feature descriptors can be generated at least in part by generating a description of the feature as depicted in a local image patch extracted around the feature. In some examples, a feature descriptor can describe a feature as a collection of one or more feature vectors. The VIO tracker 315, in some cases with the mapping engine 330 and/or the relocalization engine 355, can associate the plurality of features with a map of the environment based on such feature descriptors. The feature tracking engine 320 of the VIO tracker 315 can perform feature tracking by recognizing features in each image that the VIO tracker 315 already previously recognized in one or more previous images, in some cases based on identifying features with matching feature descriptors in different images. The feature tracking engine 320 can track changes in one or more positions at which the feature is depicted in each of the different images. For example, the feature extraction engine can detect a particular corner of a room depicted in a left side of a first image captured by a first camera of the cameras 310. The feature extraction engine can detect the same feature (e.g., the same particular corner of the same room) depicted in a right side of a second image captured by the first camera. The feature tracking engine 320 can recognize that the features detected in the first image and the second image are two depictions of the same feature (e.g., the same particular corner of the same room), and that the feature appears in two different positions in the two images. The VIO tracker 315 can determine, based on the same feature appearing on the left side of the first image and on the right side of the second image that the first camera has moved, for example if the feature (e.g., the particular corner of the room) depicts a static portion of the environment.

The VIO tracker 315 can include a sensor integration engine 325. The sensor integration engine 325 can use sensor data from other types of sensors 305 (other than the cameras 310) to determine information that can be used by the feature tracking engine 320 when performing the feature tracking. For example, the sensor integration engine 325 can receive IMU data (e.g., which can be included as part of the sensor data 365) from an IMU of the one or more sensors 305. The sensor integration engine 325 can determine, based on the IMU data in the sensor data 365, that the SLAM system 300 has rotated 15 degrees in a clockwise direction from acquisition or capture of a first image and capture to acquisition or capture of the second image by a first camera of the cameras 310. Based on this determination, the sensor integration engine 325 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 320 can take this expectation into consideration in tracking features between the first image and the second image.

Based on the feature tracking by the feature tracking engine 320 and/or the sensor integration by the sensor integration engine 325, the VIO tracker 315 can determine a 3D feature positions 372 of a particular feature. The 3D feature positions 372 can include one or more 3D feature positions and can also be referred to as 3D feature points. The 3D feature positions 372 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. The VIO tracker 315 can also determine one or more keyframes 370 (referred to hereinafter as keyframes 370) corresponding to the particular feature. A keyframe (from one or more keyframes 370) corresponding to a particular feature may be an image in which the particular feature is clearly depicted. In some examples, a keyframe (from the one or more keyframes 370) corresponding to a particular feature may be an image in which the particular feature is clearly depicted. In some examples, a key frame corresponding to a particular feature may be an image that reduces uncertainty in the 3D feature positions 372 of the particular feature when considered by the feature tracking engine 320 and/or the sensor integration engine 325 for determination of the 3D feature positions 372. In some examples, a keyframe corresponding to a particular feature also includes data about the pose 385 of the SLAM system 300 and/or the camera(s) 310 during capture of the keyframe. In some examples, the VIO tracker 315 can send 3D feature positions 372 and/or keyframes 370 corresponding to one or more features to the mapping engine 330. In some examples, the VIO tracker 315 can receive map slices 375 from the mapping engine 330. The VIO tracker 315 can feature information within the map slices 375 for feature tracking using the feature tracking engine 320.

Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). The pose 385 can include an orientation of the SLAM system 300 and/or of the cameras 310 in 3D space, such as pitch, roll, yaw, or some combination thereof. In some examples, the VIO tracker 315 can send the pose 385 to the relocalization engine 355. In some examples, the VIO tracker 315 can receive the pose 385 from the relocalization engine 355.

The SLAM system 300 also includes a mapping engine 330. The mapping engine 330) generates a 3D map of the environment based on the 3D feature positions 372 and/or the keyframes 370 received from the VIO tracker 315. The mapping engine 330 can include a map densification engine 335, a keyframe remover 340, a bundle adjuster 345, and/or a loop closure detector 350. The map densification engine 335 can perform map densification, in some examples, increase the quantity and/or density of 3D coordinates describing the map geometry. The keyframe remover 340 can remove keyframes, and/or in some cases add keyframes. In some examples, the keyframe remover 340) can remove keyframes 370 corresponding to a region of the map that is to be updated and/or whose corresponding confidence values are low. The bundle adjuster 345 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 350 can recognize when the SLAM system 300 has returned to a previously mapped region, and can use such information to update a map slice and/or reduce the uncertainty in certain 3D feature points or other points in the map geometry. The mapping engine 330 can output map slices 375 to the VIO tracker 315. The map slices 375 can represent 3D portions or subsets of the map. The map slices 375 can include map slices 375 that represent new, previously-unmapped areas of the map. The map slices 375 can include map slices 375 that represent updates (or modifications or revisions) to previously-mapped areas of the map. The mapping engine 330 can output map information 380 to the relocalization engine 355. The map information 380 can include at least a portion of the map generated by the mapping engine 330. The map information 380 can include one or more 3D points making up the geometry of the map, such as one or more 3D feature positions 372. The map information 380 can include one or more keyframes 370 corresponding to certain features and certain 3D feature positions 372.

The SLAM system 300 also includes a relocalization engine 355. The relocalization engine 355 can perform relocalization, for instance when the VIO tracker 315 fail to recognize more than a threshold number of features in an image, and/or the VIO tracker 315 loses track of the pose 385 of the SLAM system 300 within the map generated by the mapping engine 330. The relocalization engine 355 can perform relocalization by performing extraction and matching using an extraction and matching engine 360. For instance, the extraction and matching engine 360 can by extract features from an image captured by the cameras 310 of the SLAM system 300 while the SLAM system 300 is at a current pose 385, and can match the extracted features to features depicted in different keyframes 370, identified by 3D feature positions 372, and/or identified in the map information 380. By matching these extracted features to the previously-identified features, the relocalization engine 355 can identify that the pose 385 of the SLAM system 300 is a pose 385 at which the previously-identified features are visible to the cameras 310 of the SLAM system 300, and is therefore similar to one or more previous poses 385 at which the previously-identified features were visible to the cameras 310. In some cases, the relocalization engine 355 can perform relocalization based on wide baseline mapping, or a distance between a current camera position and camera position at which feature was originally captured. The relocalization engine 355 can receive information for the pose 385 from the VIO tracker 315, for instance regarding one or more recent poses of the SLAM system 300 and/or cameras 310, which the relocalization engine 355 can base its relocalization determination on. Once the relocalization engine 355 relocates the SLAM system 300 and/or cameras 310 and thus determines the pose 385, the relocalization engine 355 can output the pose 385 to the VIO tracker 315.

In some examples, the VIO tracker 315 can modify the image in the sensor data 365 before performing feature detection, extraction, and/or tracking on the modified image. For example, the VIO tracker 315 can rescale and/or resample the image. In some examples, rescaling and/or resampling the image can include downscaling, downsampling, subscaling, and/or subsampling the image one or more times. In some examples, the VIO tracker 315 modifying the image can include converting the image from color to greyscale, or from color to black and white, for instance by desaturating color in the image, stripping out certain color channel(s), decreasing color depth in the image, replacing colors in the image, or a combination thereof. In some examples, the VIO tracker 315 modifying the image can include the VIO tracker 315 masking certain regions of the image. Dynamic objects can include objects that can have a changed appearance between one image and another. For example, dynamic objects can be objects that move within the environment, such as people, vehicles, or animals. A dynamic objects can be an object that have a changing appearance at different times, such as a display screen that may display different things at different times. A dynamic object can be an object that has a changing appearance based on the pose of the camera(s) 310, such as a reflective surface, a prism, or a specular surface that reflects, refracts, and/or scatters light in different ways depending on the position of the camera(s) 310 relative to the dynamic object. The VIO tracker 315 can detect the dynamic objects using facial detection, facial recognition, facial tracking, object detection, object recognition, object tracking, or a combination thereof. The VIO tracker 315 can detect the dynamic objects using one or more artificial intelligence algorithms, one or more trained machine learning models, one or more trained neural networks, or a combination thereof. The VIO tracker 315 can mask one or more dynamic objects in the image by overlaying a mask over an area of the image that includes depiction(s) of the one or more dynamic objects. The mask can be an opaque color, such as black. The area can be a bounding box having a rectangular or other polygonal shape. The area can be determined on a pixel-by-pixel basis.

Figure 4A:
FIG. 4A is an example frame captured by a SLAM system, in accordance with some examples.
Figure 4B:
FIG. 4B is an example of detected depth values for the frame illustrated in FIG. 4A, in accordance with some examples.

FIG. 4A and FIG. 4B illustrate an example frame 400 of a scene. Frame 400 provides illustrative examples of feature information that can be captured and/or processed by an XR system (e.g., XR system 200 shown in FIG. 2) during tracking and/or mapping. In the illustrated example of FIG. 4A, example features 402 are illustrated as circles of differing diameters. In some cases, the center of each of the features 402 can be referred to as a feature center location. In some cases, the diameter of the circles can represent a feature scale (also referred to as a blob size) associated with each of the example features 402. Each of the features 402 can also include a dominant orientation vector 403 illustrated as a radial segment. In one illustrative example, the dominant orientation vector 403 (also referred to as a dominant orientation herein) can be determined based on pixel gradients within a patch (also referred to as a blob or region). For instance, the dominant orientation vector 403 can be determined based on the orientation of edge features in a neighborhood (e.g., a patch of nearby pixels) around the center of the feature. An example of a dominant orientation vector calculation technique is illustrated with respect to FIG. 7. Another example feature 404 is shown with a dominant orientation 406. In some implementations, a feature can have multiple dominant orientations. For example, if no single orientation is clearly dominant, then a feature can have two or more dominant orientations associated with the most prominent orientations. Another example feature 408 is illustrated with two dominant orientation vectors 410 and 412. In addition to the feature center location, blob size, and dominant orientation, each of the features 402, 404, 408 can also be associated with a descriptor that can be used to associate the features between different frames. For example, if the pose of the camera that captured frame 400 changes, the x-y coordinate of each of the feature center locations for each of the features 402, 404, 408 can also change, and the descriptor assigned to each feature can be used to match the features between the two different frames. In some cases, the tracking and mapping operations of an XR system can utilize different types of descriptors for the features 402, 404, 408. Examples of descriptors for the features 402, 404, 408 can include SIFT, FREAK, and/or other descriptors. In some cases, a tracker can operate on image patches directly or can operate on the descriptors (e.g., SIFT descriptors, FREAK descriptors, etc.).

FIG. 4B illustrates depth information associated with the frame 400 shown in FIG. 4A. In some implementations, in addition to capturing images of a scene, an XR system can capture or determine depth measurements (also referred to as distance or distance measurements). For instance, in some examples, a separate sensor (e.g., a depth sensor) can capture depth measurements simultaneously or in close temporal proximity (e.g., within 1 ms, within 10 ms, or within any other desired time threshold) with capturing image frames. In some examples, the XR system can estimate depth by performing triangulation or other technique using map points. Based on the triangulation, the XR device or system can estimate the depth. In some cases, the depth measurements (or distance) can be measured for each of the feature 402, 404, 408 stored in the image. Since in some cases the camera can be moving and changing pose, in some cases, depth information can be captured as estimated locations of the features based on measurements of the pose changes. For example, measurements from an IMU can be used to estimate the pose change of the camera, and based on the estimated pose change, the pixel location of the features 402, 404, 408 can also be estimated. In the illustrated example, depth measurement 452 can be associated with the feature 404 shown in FIG. 4A and depth measurement 454 can be associated with the feature 408 shown in FIG. 4A. In some examples, the depth measurements (e.g., depth measurement 452) can correspond to the distance between the camera and the feature. In illustrated example of FIG. 4B, the depth measurement 452 of feature 404 from the camera as shown is 3,500 mm. In addition, in the illustrated example of FIG. 4A, the scale radius of the feature 404 as shown is 22 pixels. In one illustrative example, the corresponding metric scale for the feature 404 is 20 cm.

Figure 5:
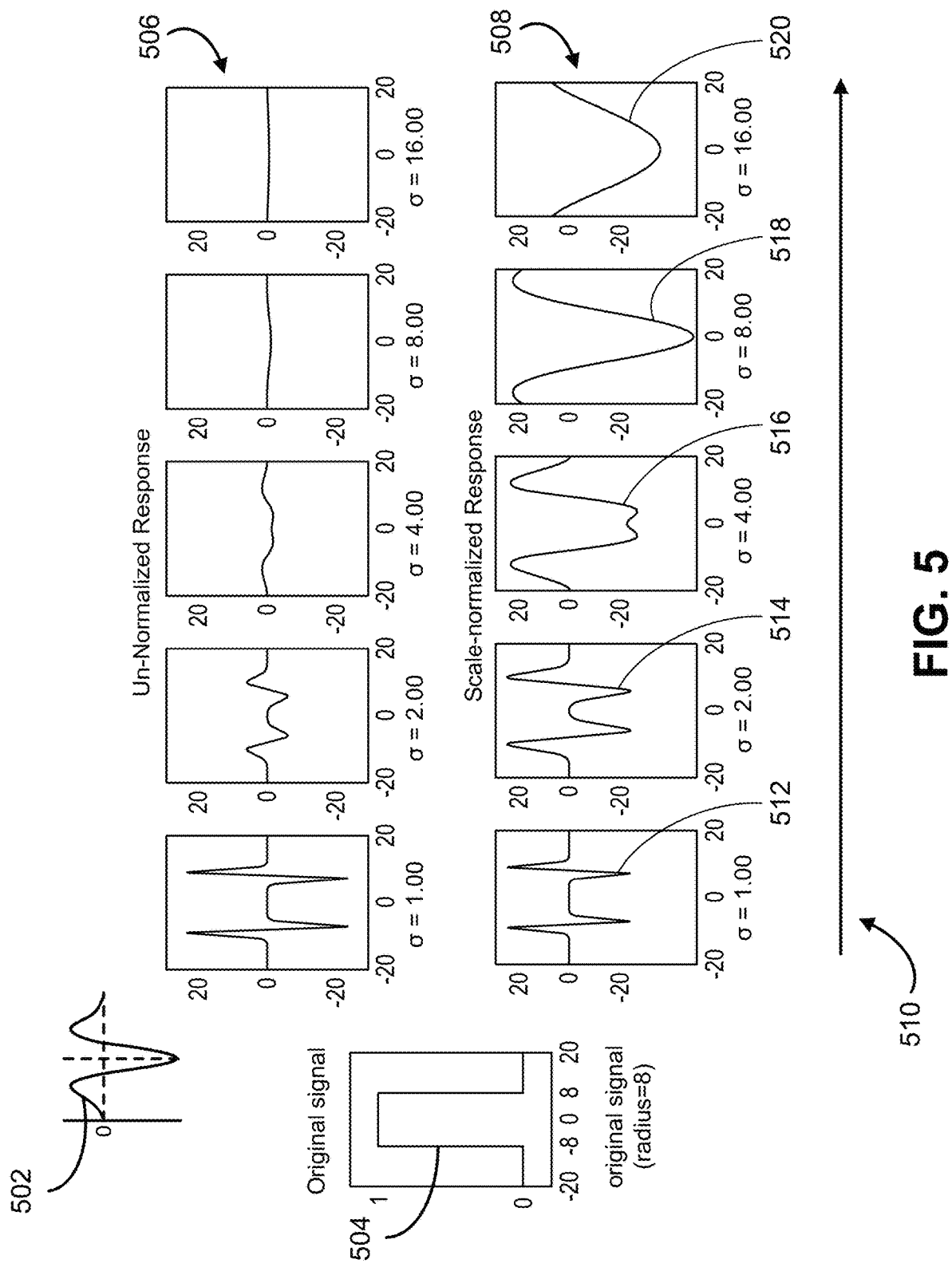
FIG. 5 illustrates an example one-dimensional blob detection technique, in accordance with some examples.

FIG. 5 illustrates an example one-dimensional blob (or feature) detection technique. The one-dimensional blob detection technique illustrated in FIG. 5 provides an explanation of how features 402, 404, 408 shown in frame 400 of FIG. 4A and FIG. 4B can be detected by an XR system (e.g., XR system 200 shown in FIG. 2). As shown in FIG. 5, in some implementations, a Laplacian of Gaussian (LoG) function 502 can be used to perform blob detection. As shown in FIG. 5, original signal 504 can be a 1-dimensional representation of an object. As shown, the original signal 504 associated with the object has a value of 1 (e.g., indicating the presence of an object) from pixel range −8 to +8, and has a value of 0) (e.g., indicating the absence of an object) outside of the pixel range −8 to +8. As shown in the example, blob detection can be performed by convolving the original signal 504 and different LoG functions with different variance values $\sigma^2$. The illustrated example of FIG. 5 shows the results of convolving five LoG functions with respective values of σ from left to right of σ=1, 0=2, 0=4, 0=8, and σ=16 with the original signal 504. FIG. 5 includes a first row 506 illustrating un-normalized responses of the convolutions and a second row 508 illustrating scale-normalized responses. Moving from left to right in the direction of arrow 510, the plots in both rows represent convolution results for Laplacian of Gaussian functions with values of σ=1, σ=2, σ=4, σ=8, and σ=16, respectively. Each of the responses in the normalized plots 512, 514, 516 illustrate multiple peaks, indicating that the LoG function used for the convolution has a width smaller than the object in the original signal 504. In contrast, the plots 518 and 520 both include a single peak. The plot 518 shows the largest (negative) maximum peak value, which indicates that the LoG with σ=8 is closest in size to the object represented by original signal 504.

Figure 6B:
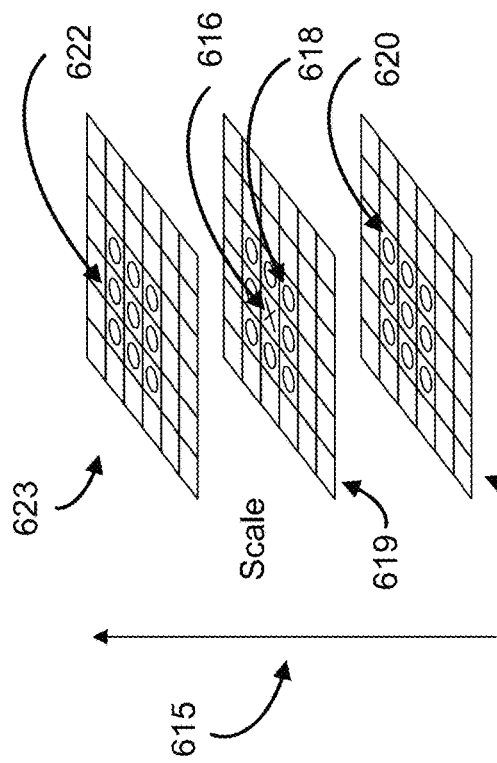
FIG. 6B and FIG. 6C illustrate an example keypoint detection technique, in accordance with some examples.
Figure 6C:
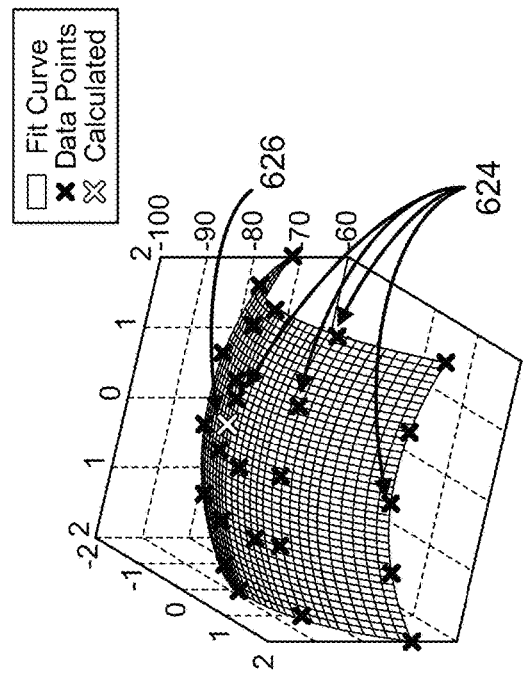
Figure 6A:
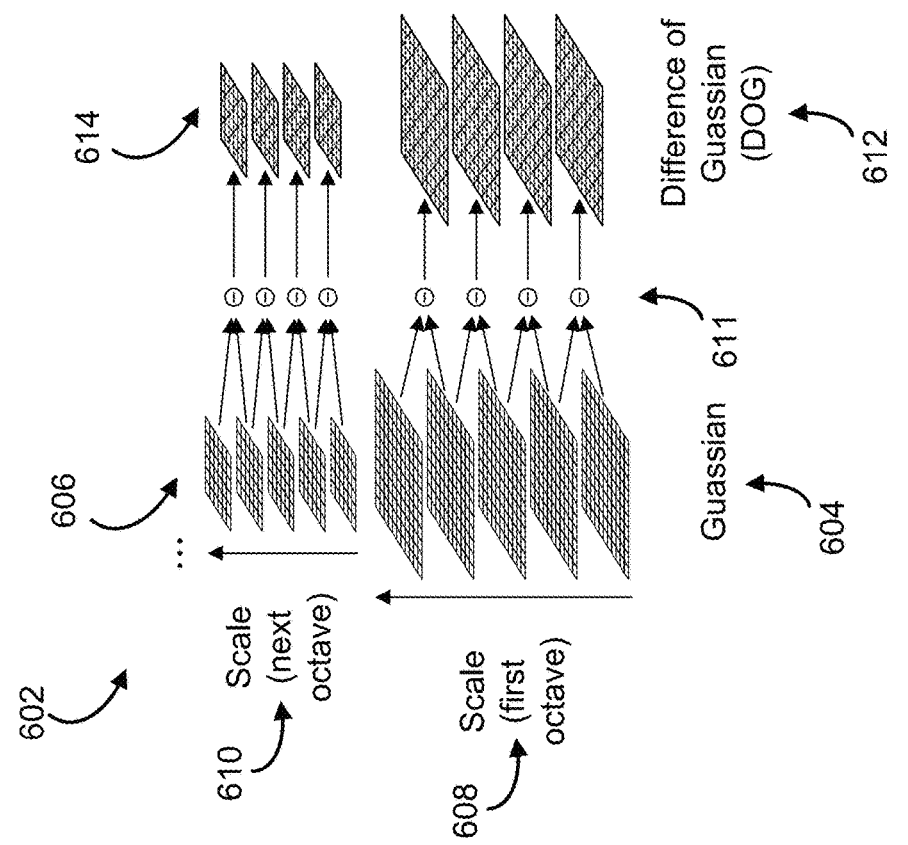
FIG. 6A illustrates an example of a blob detection technique using a scale space search, in accordance with some examples.

FIG. 6A illustrates an example of blob (or feature) detection using a scale space search. In the example of FIG. 6A, the scale space 602 can include a first octave 604 and a second octave 606. In one illustrative example, the first octave 604 can include frames at the original frame resolution, and the second octave 606 can include frames with a reduced resolution. In one illustrative example, the reduced resolution frames in the second octave 606 can be produced by subsampling the original frame. For example, the frames in the second octave 606 can be formed by removing every other row and every other column from the original frame, resulting in second octave frames with one fourth the number of pixels contained in the original frame. In the example scale space shown in FIG. 6A, each of the frames included in each octave can be convolved with a Gaussian function (e.g., a two-dimensional Gaussian filter). In some implementations, moving in the direction of the arrow 608, the value of σ for the Gaussian filter applied to the first octave 604 can be increased, similar to the increasing values of σ in the direction of arrow 510 shown in FIG. 5. Similarly, in some implementations, moving in the direction of the arrow 610, the value of σ for the Gaussian filter applied to the second octave 606 can be increased. In some cases, the value of σ can be applied to the first frame in each octave, and the value for each subsequent frame can be scaled by a factor of k. In some cases, each successive frame moving in the direction of arrow 608 can be used to detect increasingly large features or blobs. As indicated by the subtraction symbols 611, adjacent Gaussian filtered frames in the scale space 602 can be subtracted to produce one or more difference of Gaussian (DoG) arrays (also referred to as DoG herein). In the illustrated example, subtracting adjacent frames of the five Gaussian filtered frames in the first octave 604 can produce four DoG arrays 612 for the first octave. Similarly, subtracting adjacent Gaussian filtered frames of the five Gaussian filtered frames in the second octave 606 can produce four DoG arrays 614 for the second octave 606. Although the illustration of FIG. 6A shows two octaves with five Gaussian filtered frames per octave and a corresponding resulting four DoG arrays per octave, in some cases, more than two scale space octaves and/or scale space octaves with different numbers of Gaussian filtered frames per octave (e.g., less than five or more than five) can be used to form a scale space without departing from the scope of the present disclosure. It should be understood that the DOG arrays described with respect to FIG. 6A provide an illustrative example of a more general concept of scale space layers included in a scale space (e.g., scale space 602). In some examples, the DoG arrays described with respect to FIG. 6A can be replaced with other types of scale space layers. For example, scale space layers based on LoG, SURF, or other blob detection techniques can be used without departing from the scope of the present disclosure.

FIG. 6B and FIG. 6C illustrate an example of a keypoint detection technique. In some cases, after the DOG arrays 612 and 614 have been calculated, the DOG arrays 612 and 614 can be searched for local extrema (e.g., minima or maxima) which can correspond to keypoints (e.g., points of interest) of the original frame. As illustrated in FIG. 6B, an example search region 615 can include a portion of three different DoG arrays adjacent to one another from each octave, such as three of the DOG arrays 612 for the first octave 604 or three of the DOG arrays 614 for the second octave 606. In some cases, each point in each of the DOG arrays in the search region 615 can be examined to determine whether the point is a local extremum (e.g., local minimum or local maximum). In the illustrated example of FIG. 6B, the data point 616 can be compared against neighbor pixels 618 in the same scale 619 as well as neighbor pixels 620 in the scale below 621 and neighbor pixels 622 in the scale above 623. In the illustrated example, the data point 616 is compared against twenty six other points (eight on the same scale, and nine on each of the scales above and below) to determine whether it is a local maximum or minimum of those points.

FIG. 6C illustrates an example of a keypoint localization process utilizing a 3D quadratic curve fitting. In some cases, the data point 616 and neighbor pixels 624 can be fit to a 3D quadratic curve 625 to identify the location of the maximum or minimum 626. In some cases, the neighbor pixels 624 can correspond to neighbor pixels 618 in the same scale 619 as data point 616, neighbor pixels 620 in the scale below 621, and neighbor pixels 622 in the scale above 623. In one illustrative example, a Taylor expansion around the data point 616 can be used to determine the location of the local minimum or maximum value within the neighborhood of the data point 616. In some cases, the interpolation using the 3D quadratic curve fitting can determine the location of the maximum or minimum 626 with subpixel and sub-scale accuracy (e.g., at a value of σ between the discrete values of σ used in the scale space 602). In some cases, the minimum and maximum values determined from the DOG arrays as described above can correspond to the pixel center locations of keypoints associated with features in the original frame. In addition to the pixel center locations of the keypoints, the value of σ associated with the keypoints can indicate the blob scale (or feature scale) of the feature within the frame. In some cases, the blob scale of a feature can be referred to as the blob size of the feature. In some cases, the blob scale of the feature can be expressed in as a number of pixels. In some cases, the blob scale can be expressed as a radius (or diameter) of a circle centered at the pixel center location of the keypoint determined from the scale space search.

Figure 7:
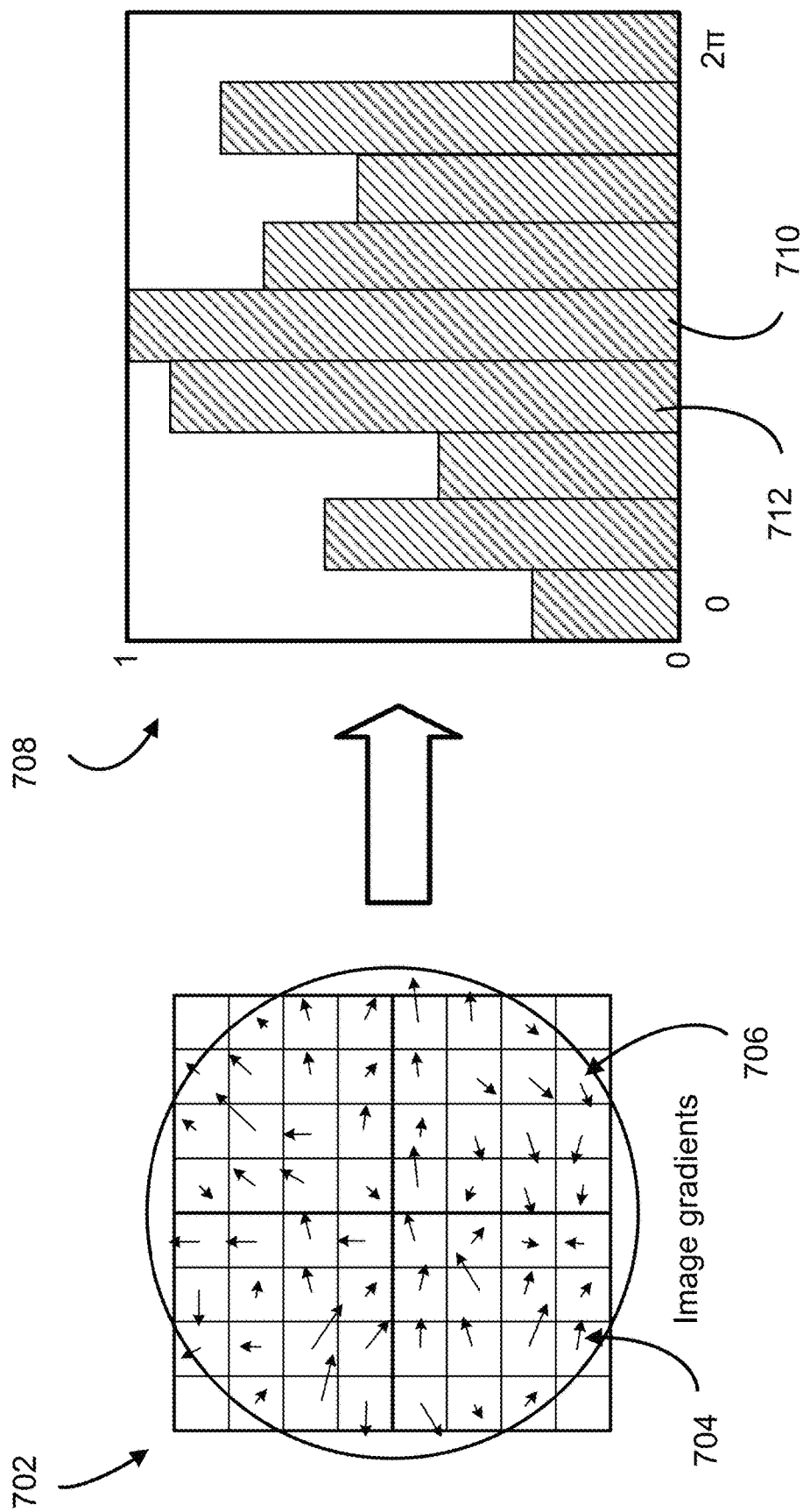
FIG. 7 illustrates an example dominant orientation calculation technique, in accordance with some examples.

FIG. 7 illustrates an example dominant orientation calculation technique. In some cases, in addition to detecting the keypoints and blob size of a feature, each feature can also be associated with a dominant orientation. As illustrated in FIG.

7, gradients 704, 706 for pixels a patch of pixels 702 around each keypoint can be calculated and binned into a histogram 708. In one illustrative example, the gradients 704, 706 can indicate the sharpness and orientation of edges detected within the patch of pixels 702. In the illustrated example, the histogram 708 includes bins associated with different ranges of gradient directions between ( ) and 2x radians. In some cases, the dominant orientation of the feature can correspond to the highest value 710 of the histogram 708. In some cases, a second dominant orientation can be assigned when the second highest value 712 of the histogram 708 is within a threshold percentage of the highest value 710. In one illustrative example, a second dominant orientation can be assigned when the second highest value 712 is within 80% of the highest value 710. In some cases, additional dominant directions can also be assigned if more bins of the histogram 708 fall within the threshold percentage of the highest value 710 of the histogram 708.

In some cases, by assigning a dominant orientation to a feature, a tracker or mapper included in an XR system (e.g., XR system 200 shown in FIG. 2) can associate features in different frames even when the features are rotated relative to one another in different frames of the same scene (e.g., when the camera moves to a different location). For example, the XR system may capture a new frame and simultaneously determine a pose change relative to the pose of the camera during a previously captured frame. In some cases, the pose during capture of the new frame can be compared to the pose during capture of a keyframe. In some cases, the keyframe can be stored by a mapper included in the XR system. In some cases, based on the detected pose change, the XR system can estimate the dominant orientation of previously detected features in the newly captured frame. In some cases, the dominant orientation of features in the new frame can be compared with the estimated dominant orientation of the features in the previously captured frame adjusted for the pose change to correlate features between the new frame and the previously captured frame.

Figure 8:
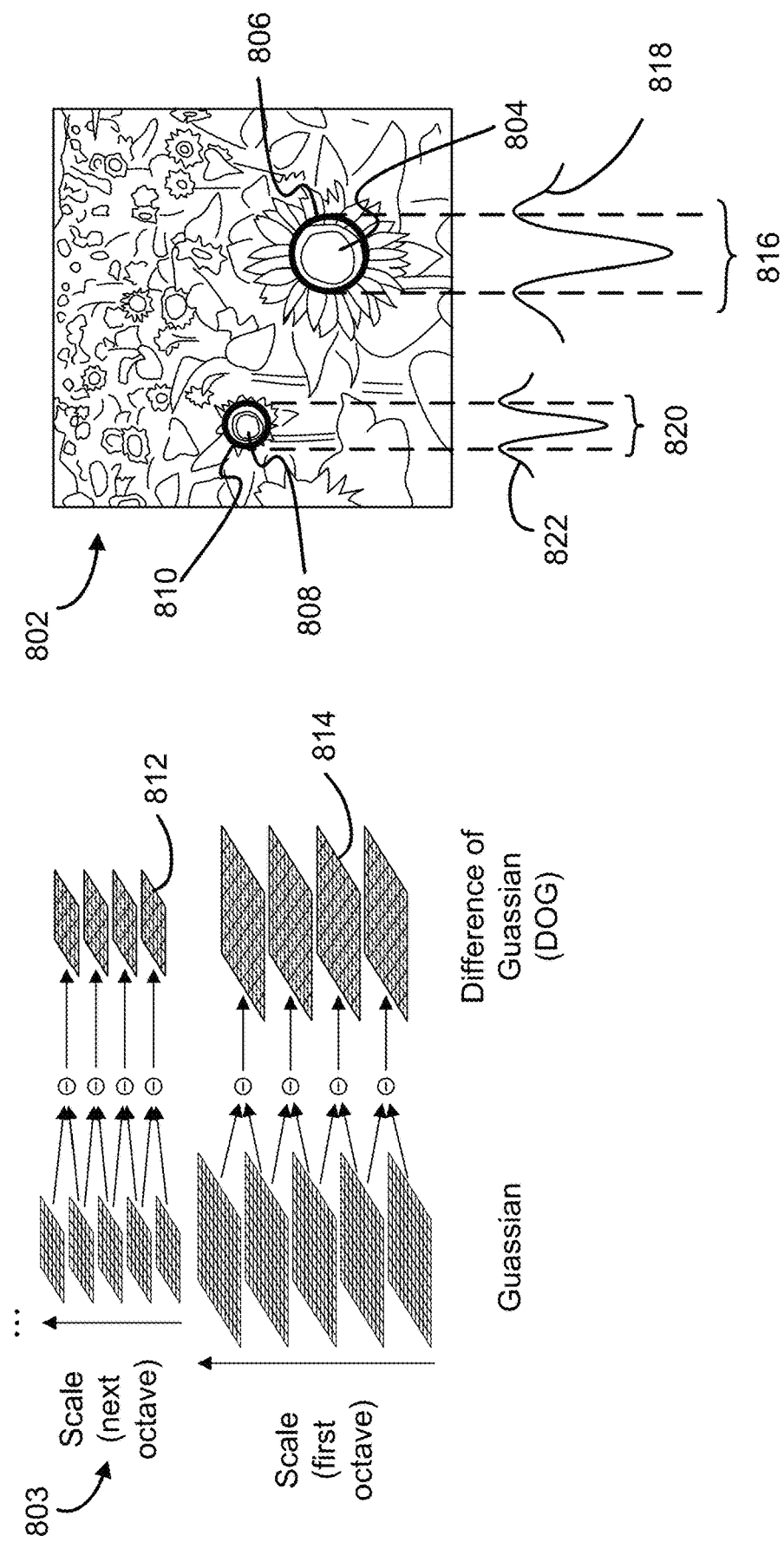
FIG. 8 illustrates an example of features detected in a frame using a scale space search, in accordance with some examples.

FIG. 8 illustrates an example of features detected in a frame using a full scale space search. FIG. 8 illustrates a frame 802 that includes many sunflowers including sunflower 804 and sunflower 808. In the illustration of FIG. 8, a feature 806 is associated with the sunflower 804 and a feature 810 is associated with sunflower 808. In the illustrated example of FIG. 8, a scale space 803 can be formed from the frame 802 and DoG arrays can be calculated and searched as described with respect to FIG. 6A through FIG. 6C to determine the feature location and scale (e.g., blob size) of the features 806 and 810. In the illustrated example of FIG. 8, the scale containing the local extremum associated with feature 806 is shown as DoG array 812 and the scale containing the local extremum associated with feature 810 is shown as DoG array 814. As illustrated, the feature 806 has a diameter 816, which can also be referred to as the blob scale of feature 806. An example Gaussian function 818 that can correspond to the blob scale of the feature 806 is illustrated as matching the diameter 816 of feature 806. As illustrated, the feature 810 has a diameter (or blob size) 820. Similarly, an example Gaussian function 822 that can correspond to the blob scale of the feature 810 is illustrated as matching the diameter 820 of feature 806. As illustrated, the feature 810 has a diameter (or blob size) 820. In some cases, the diameters 816 and 820 can be expressed as a number of pixels.

FIG. 9A and FIG. 9B are diagrams illustrating the relationship between distance of an object from a camera and corresponding size of the object in a frame. As shown in FIG. 9A, a camera can obtain a frame of an object 904 with width 910 at a distance 912 from the focal point of the camera 902. In one illustrative example, the width 910 can correspond to the physical size of sunflower 804 shown in FIG. 8. The apparent size 908 of the object 904 at the image plane 903 can change based on the angle 906 of a triangle formed by the focal point of the camera and the object 904. As shown in FIG. 9B, for the same object 904 with width 910 at a greater distance 922 from the camera 902, the angle 916 is reduced and the apparent size 918 of the object 904 captured by the camera is also reduced. However, because XR systems can capture depth information in addition to capturing images of a scene, the physical dimensions of an object such as object 904 can be determined based on the apparent size of the object and the measured distance of the object by solving for the metric scale M of the object 904 in Equation (1):

$$\sigma^c = \frac{Mf}{2Z'} \tag{1}$$

where $\sigma^c$ corresponds to the blob size of the feature associated with the object 904, f is the focal length of camera 902, and Z' is the distance between the object and the focal point of the camera 902. As shown with respect to FIG. 4B, the depth information Z' for an object can be captured by a depth sensor simultaneous capturing the image of the object 904. In some cases, the metric scale M of the object 904 can be stored in a map (e.g., a map generated by a mapping engine 330) shown in FIG. 3). Once the metric scale M of an object 904 is known, the depth and stored metric scale M associated with the object 904 can be used to estimate the blob size $\sigma^c$ of the feature associated with the object 904 in subsequent frames using Equation (1). In some implementations, in addition to or as an alternative to storing the metric scale M of an object in the map, the pixel scale and distance of the feature associated with the object 904 can be stored in the map. In some cases, camera calibration information can also be included in the map. In some embodiments, the camera calibration information can be used to determine the estimated blob size of the feature associated with the object 904 in subsequent frames.

FIG. 10A and FIG. 10B illustrate an example of a targeted scale space search. In some cases, the metric scale information of a feature as described with respect to FIG. 9A and FIG. 9B and distance information associated with the feature can be used to target a specific subset of a scale space (e.g., specific scale space layers) that is most likely to include a particular feature. In the illustrated example of FIG. 10A, a portion of a scale space 1002 includes six DoG arrays based on Gaussian filtered frames from a particular octave of the scale space. FIG. 10B illustrates six gaussian functions 1012 that each represent a different scale value $\sigma$ associated with each of the six DoG arrays 1003 shown in FIG. 10A. In some implementations, an estimated feature scale 1014 (e.g., $\sigma^c$ in Equation 1 above) of a feature F associated with an object determined according to Equation (1) can be compared with the scale values $\sigma$ associated with the six DoG arrays 1003 to determine the DOG array with the closest (or nearest) scale to the estimated feature scale 1014. In the illustrated example of FIG. 10A, the DOG array 1004 is determined to have the closest scale to the estimated feature scale of the feature F. In some cases, the DOG array 1004 with the closest scale to $\sigma^c$ is expected to contain the maximum or minimum response associated with the feature F. In some implementations, an XR system (e.g., XR system 200 shown in FIG. 2) can search for the feature F in the DOG array 1004 with the closest scale and the two neighboring DoG arrays 1006, 1008. In some cases, the XR system can search for the feature F within a region of pixels 1013. For example, based on uncertainties of the pose and/or errors in the distance measurement, the calculated scale $\sigma^c$ and/or feature location 1010 can include some error. By searching for the feature F in the closest scale layer (e.g., the DOG array 1004) and neighboring scale layers (e.g., DoG arrays 1006, 1008), the likelihood of detecting the maximum response for feature F can be increased. In one illustrative example, the search space can include the eight nearest neighbors to feature location 1010 in the DOG array 1004, and the nine nearest neighbors in each of the DOG arrays 1006, 1008, similar to the local extremum search space illustrated in FIG. 6B.

In some implementation, the search neighborhood around the location 1010 can be expanded to a larger window to account for uncertainties of the pose and/or errors in the distance measurement. For example, the search region can be expanded to include a five pixel by five pixel window in each of the DOG arrays 1004, 1006, 1008. In such an implementation, the search space can include the twenty-four nearest neighbors to feature location 1010 in the DoG array 1004, and the twenty-five nearest neighbors to feature location 1010 in the DOG arrays 1006, 1008. Increasing the search region to include a greater number of pixels can increase the computational and/or memory requirements for performing a targeted scale space search. However, by limiting the search to only three DOG arrays 1004, 1006, 1008, the targeted scale space search can still save computational resources when compared with a full scale space search as described with respect to FIG. 6A through FIG. 6C.

As described above, by calculating the expected scale of a feature that has a known metric scale M (e.g., wherein a map generated by a mapper includes metric scale information for detected features), the relevant scale or scales for detecting the feature can be estimated based on the distance between the camera and the object. In some cases, this can allow a SLAM system to skip the step of searching every level of the scale space for each feature. Instead, the SLAM system can search for a feature within a nearest or closest scale layer (e.g., DoG array 1004) and neighboring scale layers (e.g., neighboring DoG arrays 1006, 1008). In some cases, reducing the search space for features can significantly reduce the number of computations required to detect each of the features in a frame.

In some cases, a SLAM system may not be able to perform a targeted scale space search for every detected feature. For example, for any feature that does not include metric scale information in the map (also referred to as an unmapped feature), the SLAM system, the SLAM system may be required to perform a more extensive scale space search for the unmapped feature.

Figure 11A:
FIG. 11A illustrates an example frame captured by a SLAM system, in accordance with some examples.
Figure 11B:
FIG. 11B is an example of detected depth values for the frame illustrated in FIG. 11A, in accordance with some examples.

FIG. 11A and FIG. 11B illustrate an example frame 1100 of a scene the includes common features with the scene shown in FIG. 4A and FIG. 4B from a different pose. In some cases, the frame 400 can be a previously captured frame and frame 1100 can be a current frame obtained by a tracker of the SLAM system. In some cases, the frame 400 can be a keyframe stored by a mapper of a SLAM system. In some cases, the tracker can obtain the keyframe and/or feature information associated with the keyframe from the mapper. In some cases, the tracker can attempt to match the features detected in the current frame 1100 with the features detected in the previously captured frame 400.

In the illustrated example of FIG. 11A, some of the detected features in current frame 1100 can be common with the features of the previously captured frame 400. For example, features 1102 and their dominant orientation vectors 1103 shown in FIG. 11A can correspond to features 402 and their dominant orientation vectors 403 shown in FIG. 4A. As shown in FIG. 11A, the feature 1104 shown in FIG. 11A can correspond to the feature 404 shown in FIG. 4A, with dominant orientation 1106 corresponding to dominant orientation 406. As shown in FIG. 11A, the feature 1104 can also have a second dominant orientation 1107 when viewed from the pose associated with the current frame 1100. In some cases, the computed dominant orientations for detected features can change based on whether certain objects in the vicinity of the feature obscure the feature as seen from a particular camera pose and/or as objects are move within the environment. In some implementations, the changes in computed dominant orientations can result from the use of edge based on a neighborhood of pixels around the feature center location to compute the dominant orientation of the feature. Finally, feature 1108 shown in FIG. 11A can correspond to feature 408 shown in FIG. 4A, dominant orientation vector 1110 can correspond to dominant orientation vector 410, and dominant orientation vector 1112 can correspond to dominant orientation vector 412. In addition, current frame 1100 can include new features such as features 1116 and 1118 that were not present in the previously captured frame 400.

FIG. 11B illustrates depth information associated with the frame 1100 shown in FIG. 11A. In the illustrated example of FIG. 11B, the distance 1152 associated with the feature as shown is 5800 mm. As shown in FIG. 11A, the pixel radius of the feature 1104 is 15 pixels. In one illustrative example, the corresponding metric scale for the feature 1104 is 20 cm. As described with respect to FIG. 10A to FIG. 10B above, in some cases, the SLAM system can obtain metric scale information corresponding to the features detected in the previously captured frame 400 and use the metric scale information along with the depth information shown in FIG. 11B to determine an estimated feature scale (or blob scale) associated with each of the features (e.g., features 1102, 1104, 1108) that are common to the previously captured frame 400 and the current frame 1100. In some cases, based on the estimated feature scale, the SLAM system can perform a targeted scale space search within a subset of the scale space. In one illustrative example, the targeted scale space search can include the scale space layer that corresponds most closely to the estimated blob scale associated with each feature (also referred to as the nearest scale space layer herein). In some cases, the targeted scale space search can also include the scale space layers above and below the nearest scale space layer. In some cases, the targeted scale space can also include a pixel neighborhood around the estimated feature location in each of the scale space In some cases, using the estimated blob scale to perform the targeted scale space search can reduce the computational effort associated with searching the entire scale space for each feature.

Figure 11C:
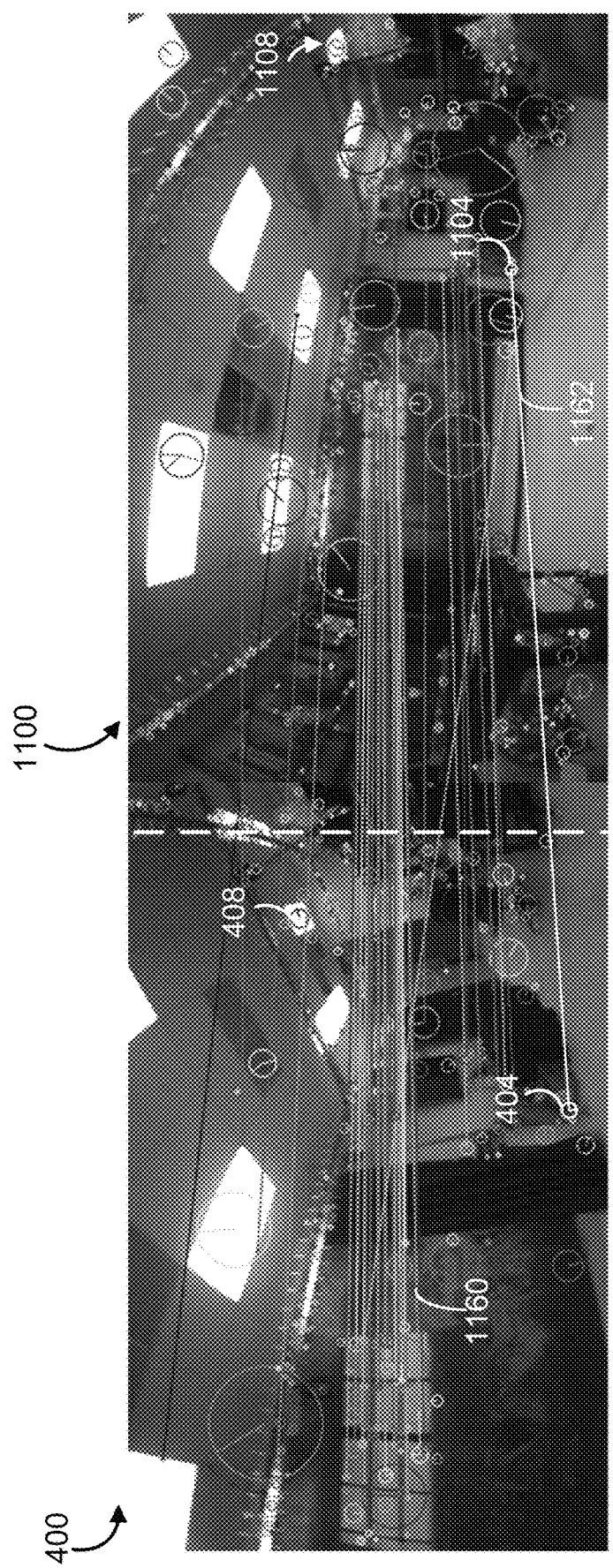
FIG. 11C illustrates an example matching between features detected from the different poses illustrated in FIG. 4A and FIG. 11A, in accordance with some examples.

FIG. 11C illustrates an example of feature matching between the frame 400 shown in FIG. 4A and the frame 1100 shown in FIG. 11A. In the illustrated example of FIG. 11C, a plurality matching lines 1160 can depict a correspondence between features in the frame 400 and features in the frame 1100 detected by a tracker and/or a mapper of a SLAM system. As shown, the line 1162 illustrates a match between the feature 404 in frame 400 and the feature 1104 in frame 1100. In the illustrated example of FIG. 11C, there is no line shown between the feature 408 in frame 400 and the feature 1108 in frame 1100. In some cases, the lack of a connecting line may indicate that the SLAM system was unable to match the features between the frame 400 and 1100. However, in the illustrated example, the lack of a matching line is not necessarily indicative of a lack of a feature match.

Figure 12:
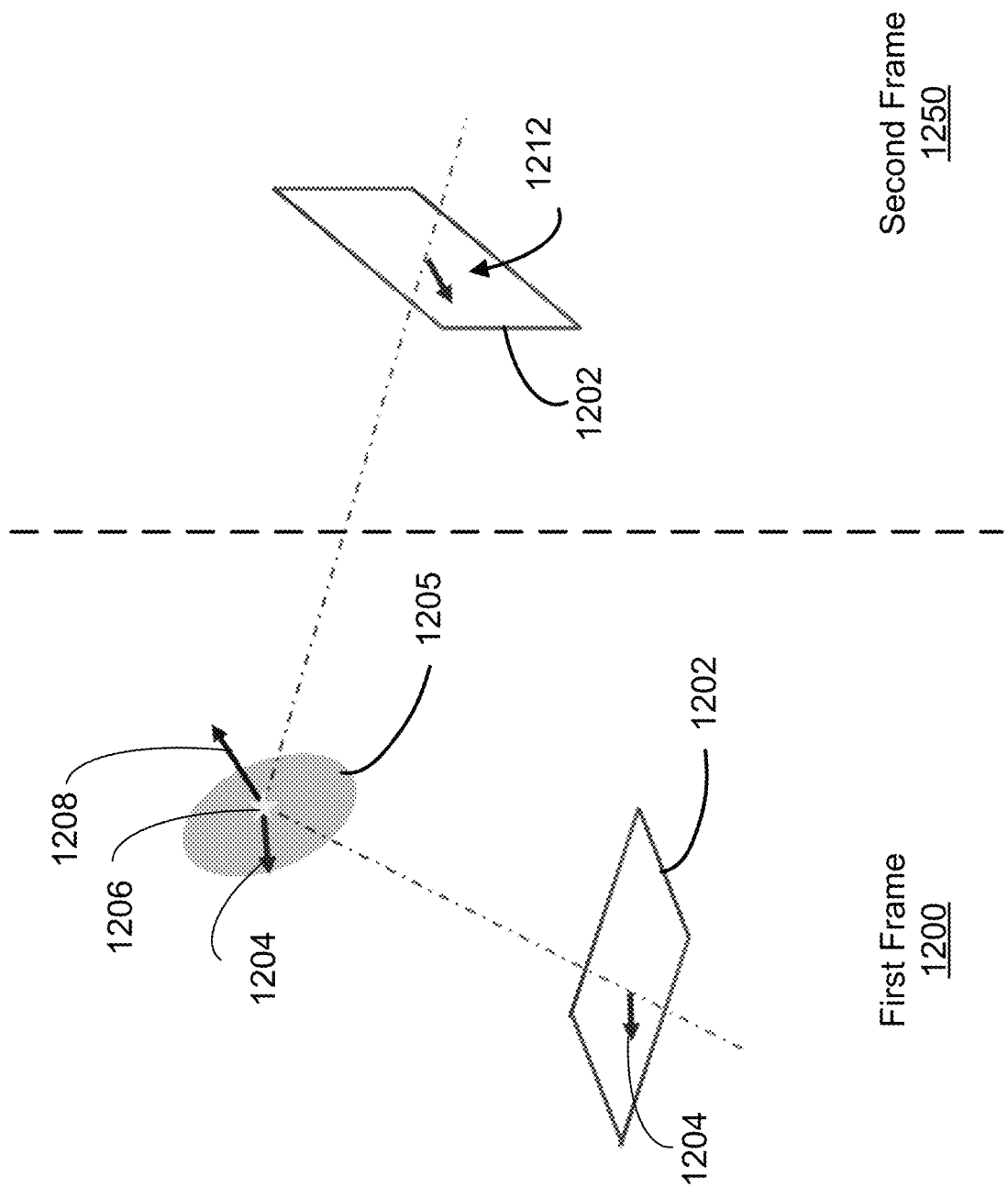
FIG. 12 illustrates an example orientation estimation technique, in accordance with some examples.

FIG. 12 illustrates an example orientation estimation technique. As shown in FIG. 12, a feature 1202 detected in a first frame 1200 can have a dominant orientation 1204. In some implementations, the dominant orientation 1204 can be represented as a vector, referred to as the dominant vector herein. In one illustrative example, the dominant orientation of feature 1202 can be determined with a histogram of image gradients in neighboring pixels of the object center as shown in FIG. 7. In some implementations, a mapper included in a SLAM system (e.g., SLAM system 300 shown in FIG. 3) can project the dominant orientation 1204 of the feature 1202 in the first frame 1200 into a plane 1205 centered at the center point 1206 of the feature 1202 (e.g., at the keypoint associated with the feature 1202). In some cases, the SLAM system can calculate a normal vector 1208 that is normal to the plane 1205 of the dominant orientation 1204. In some implementations, a SLAM system can update its pose as the SLAM system moves through the environment. In one illustrative example, the SLAM system can update its pose based on data from an IMU. In some cases, based on a change in pose between the first frame 1200 and a second frame 1250, the SLAM system can project the dominant vector computed in the plane 1205 in the pose of the first frame 1200 into the pose of the second frame 1250, as depicted by dominant orientation 1212. In some cases, a transformation can be used to project the dominant vector from the pose of the first frame 1200 into the pose of the second frame 1250. In one illustrative example, the transformation can include rotating the dominant vector by multiplying the dominant vector by a rotation vector R ($\alpha$, $\beta$, $\gamma$) that can be determined based on the yaw ($\alpha$), pitch ($\beta$), and roll ($\gamma$) of the SLAM system at the time of capturing the second frame 1250. In some cases, by reprojecting the dominant orientation using a reprojection, the determination of the dominant orientation does not need to be calculated again based on the image data. For example, for the second frame 1250, the dominant orientation may not need to be calculated using the dominant orientation determination technique described with respect to FIG. 7.

In some cases, the normal orientation for each feature in a feature map can be determined for a detection frame that the feature is detected by the SLAM system. In some cases, for all subsequent frames, the dominant orientation for the feature can be determined using a reprojection of the normal orientation. In some cases, the reprojection of the normal orientation can be based on the relative pose change between the detection frame and the subsequent frame. In some cases, the normal orientation for a feature can be periodically updated. In one illustrative example, the normal orientation for the feature can be updated each time a new keyframe containing the feature is stored by the mapper of the SLAM system. In another illustrative example, the normal orientation can be updated in instances where the viewpoint of a subsequent frame changes drastically.

Figure 13:
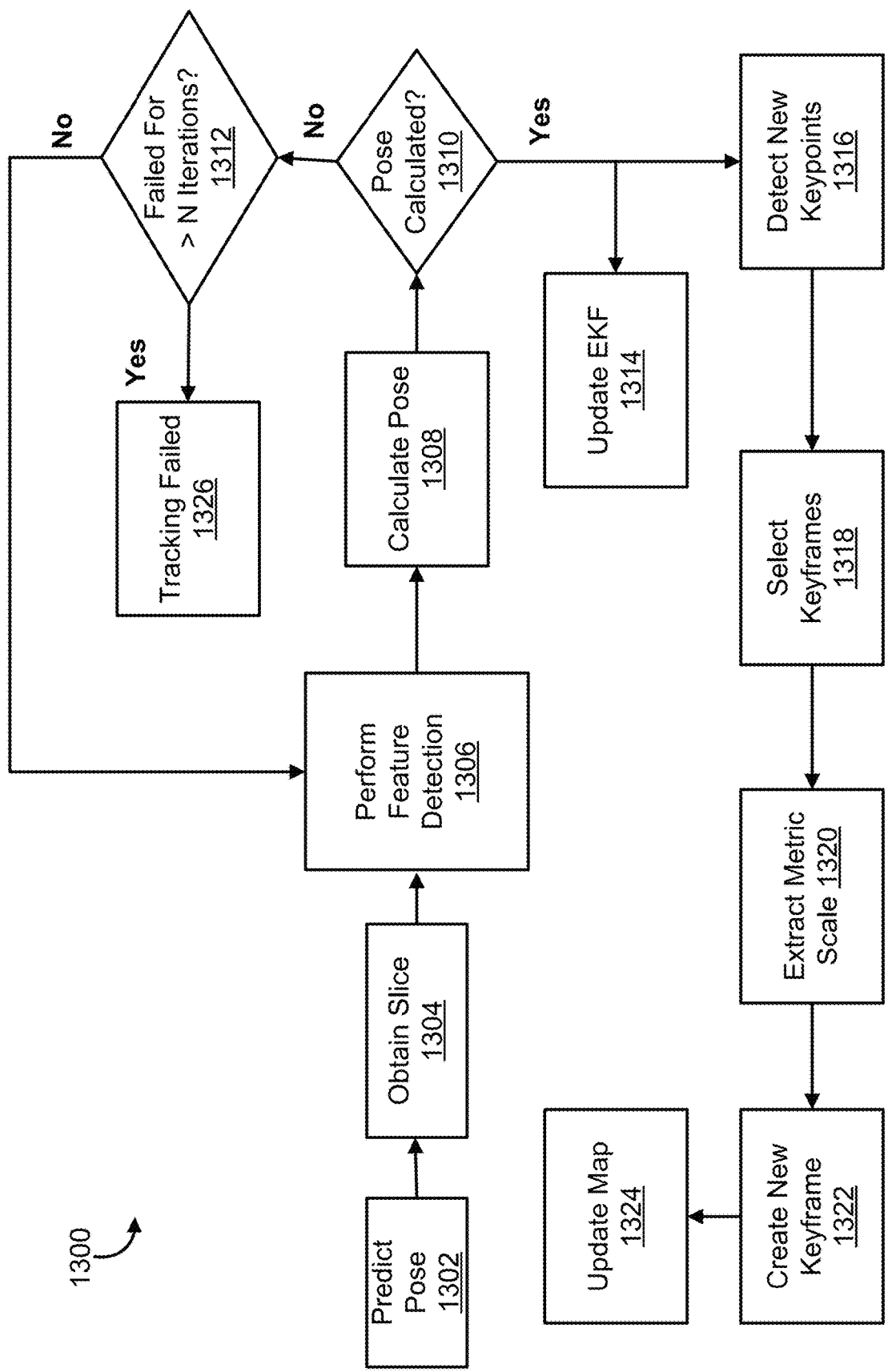
FIG. 13 is a flow diagram illustrating an example simultaneous localization and mapping (SLAM) process, in accordance with some examples.

FIG. 13 illustrates an example process 1300 for performing SLAM of features in a plurality of frames. In some cases, at block 1302, the process 1300 can predict a pose of a SLAM system (e.g., SLAM system 300 shown in FIG. 3) and/or a camera sensor. In some cases, the pose prediction can be based on data from one or more sensors. In one illustrative example, the data from the one or more sensors can include data from an IMU.

At block 1304, process 1300 can obtain a slice of features from a mapper of the SLAM system. As used herein, the term slice can refer to a relevant portion of the environment that is included in the map (e.g., a subset of the map). In some examples, the feature information obtained from the mapper can include the metric scale M of the feature as described with respect to FIG. 9A and FIG. 9B. In some examples, the information obtained from the mapper can include the normal vector calculated for the feature as described with respect to FIG. 12

At block 1306, process 1300 can obtain a captured image (e.g., a newly captured frame) and perform feature detection using a targeted scale space search as described with respect to FIG. 10A and FIG. 10B. In some cases, the closest scale layer (e.g., the DOG array 1004 shown in FIG. 10A) for the targeted scale space search can determined from the metric scale of the features stored in the map slice and the distance information obtained for the features in the captured frame. For example, the metric scale and distance information can be used to determine the estimated feature scale for the feature and the closest scale layer can be selected based on the estimated feature scale. In some cases, at block 1306, the process 1300 can determine feature descriptors for each of the detected features. In the example of process 1300, the feature descriptors determined by the tracker can be the same type of feature descriptors determined by the mapper and stored in the map slice obtained from the mapper by the tracker at block 1304.

At block 1308, the process 1300 can calculate the pose of the camera and/or SLAM system based on the locations of the features detected from the captured frame and the mapped features obtained from the mapper.

If at block 1310 the process 1300 determines that the pose calculation was not successful, the process 1300 can return to block 1306 and repeat blocks 1306 and 1308 to calculate the pose of the camera based on the features detected in the newly captured frame. In some cases, if the process 1300 determines that the pose calculation at block 1308 was not successful, the process can 1300 can continue to iteratively attempt to calculate the pose based on additional captured frames. In some cases, at block 1312, if the process 1300 is unable to successfully calculate the pose after N iterations (e.g., N frames), the process can proceed to block 1326. For example, the value of N can be two, five, seven, nine or any other number of iterations (e.g., number of frames). At block 1326, the process 1300 can determine that a localization (or tracking) operation of the SLAM system has failed. In some cases, the process 1300 can replace the map or a subset of the map. In one illustrative example, process 1300 can initialize a new map (or subset of the map, such as a map slice) and resume performing SLAM (e.g., by returning to block 1302) using information stored in the new map or subset of the map.

If at block 1310 the process 1300 determines that the pose calculation was successful, the process 1300 can proceed to block 1316 and block 1314. In some cases, at block 1314, the process 1300 can update an EKF based on the newly calculated pose information. In some cases, as shown in FIG. 13, the EKF update at block 1314 can occur in parallel to the process proceeding to block 1316. In some implementations, the EKF update at block 1314 can occur in series with block 1316. In addition, block 1314 can occur before or after block 1316 without departing from the scope of the present disclosure.

At block 1316, the process 1300 can determine whether the captured frame includes new features that require updating in the map. In some cases, process 1300 can mask the tracked features prior to determining whether the captured frame includes new features. In one illustrative example, the process 1300 can mask dynamic objects such as images on a display screen or objects that are in motion within the scene before determining whether there are new features.

At block 1318, the process 1300 can determine whether to mark the captured frame as a keyframe for inclusion in the map. For example, if the process 1300 determines that a large number of features in the captured frame are new, the captured frame can be marked as a keyframe. In one illustrative example, a frame can be marked as a keyframe if more than 10% of the features detected in the captured frame are new, or any other desired threshold percentage of the features detected in the captured frame are new. In another illustrative example, a frame can be marked as a keyframe if a threshold number of new features are detected. For example, the process 1300 can mark a keyframe if there are more than 50 new features, more than 100 new features, or more than any other desired threshold number of features. If the process 1300 marks the captured frame as a keyframe, the process 1300 can proceed to block 1320. If the captured frame is not marked as a key frame, updating the map can be bypassed and the process 1300 can forego blocks 1320 through 1324.

At block 1320, the process 1300 can extract the metric scale information for the features in the keyframe for inclusion in the map data. In some cases, the process 1300 can utilize the blob size for each feature determined at block 1306 to extract the metric scale. For example, the blob size of the features determined at block 1306 using the targeted scale space search and the detected distance of the feature can be applied in Equation (1) to determine the metric scale for each feature.

At block 1322, process 1300 can generate a new keyframe. In some cases, the new keyframe can include the keypoints, dominant orientation, descriptors, the metric scale, additional information associated with the features, or any combination thereof for each of the detected features.

At block 1324, the process 1300 can update the map with the new keyframe. In some cases, the process 1300 can provide the new keyframe to a mapper included in the SLAM system and the mapper can update the map based on feature information contained in the new keyframe.

Figure 14:
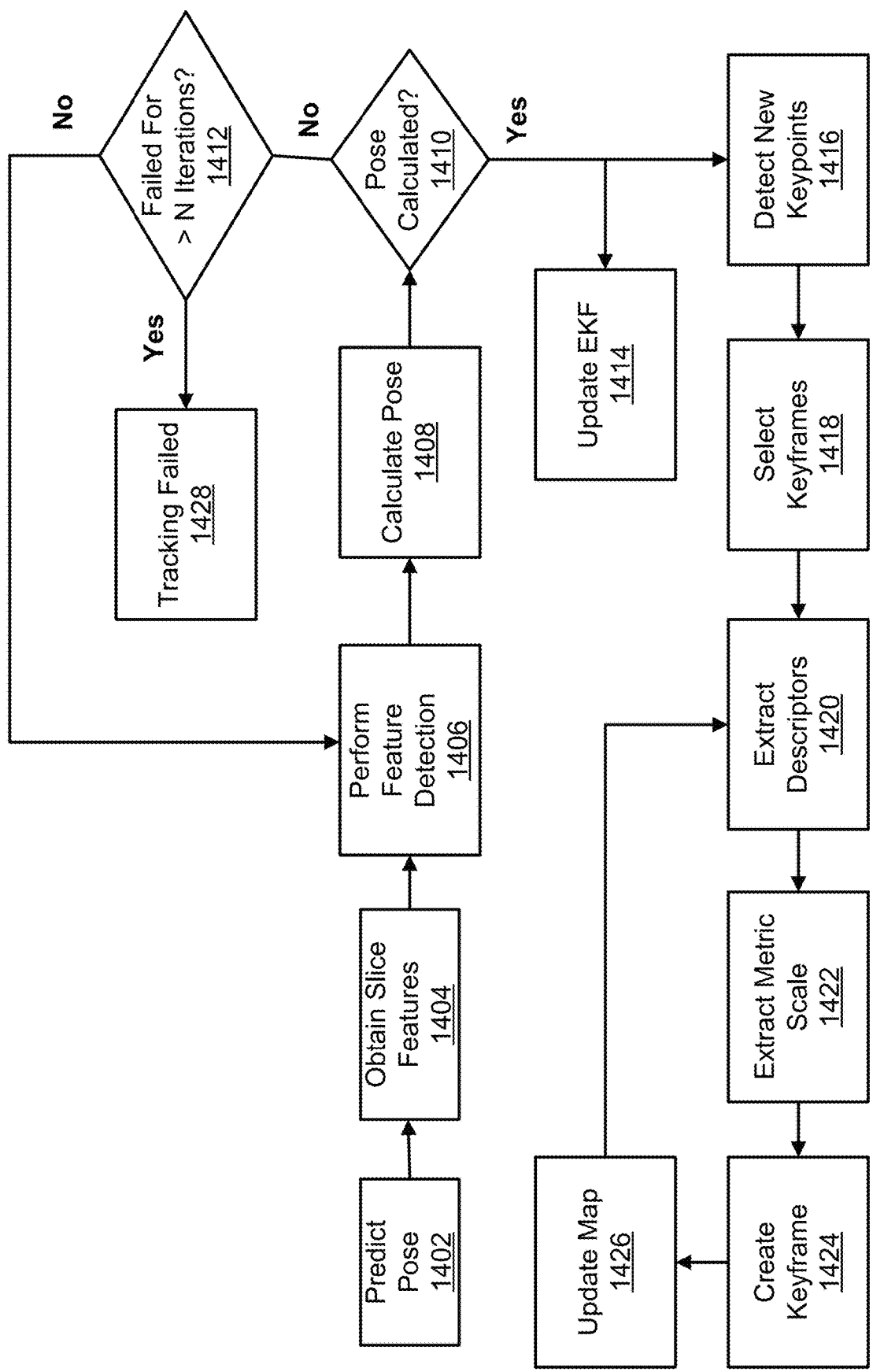
FIG. 14 is a flow diagram illustrating another example SLAM process, in accordance with some examples.

FIG. 14 illustrates another example process 1400 for performing SLAM of features in a plurality of frames. In some cases, at block 1402, the process 1400 can predict a pose of a SLAM system (e.g., SLAM system 300 shown in FIG. 3) and/or a camera sensor. In some cases, the pose prediction can be based on data from one or more sensors. In one illustrative example, the data from the one or more sensors can include data from an IMU.

At block 1404, process 1400 can obtain a slice of features from a mapper of the SLAM system. In some examples, the feature information obtained from the mapper can include the metric scale M of the feature as described with respect to FIG. 9A and FIG. 9B. In some examples, the information obtained from the mapper can include the normal vector calculated for the feature as described with respect to FIG. 12

At block 1406, process 1400 can obtain a captured image (e.g., a newly captured frame) and perform feature detection using a feature detection technique different from the targeted scale space search shown in FIG. 10A and FIG. 10B. In some cases, at block 1406, the process 1400 can perform feature matching without determining the same feature descriptors used by the mapper of the SLAM system. In one illustrative example, the process 1400 can utilize normalized cross correlation (NCC) to correlate patches of the slice obtained from the mapper and patches of the captured image.

At block 1408, the process 1400 can calculate the pose of the camera and/or SLAM system based on the locations of the features detected from the captured frame and the mapped features obtained from the mapper.

If at block 1410 the process 1400 determines that the pose calculation was not successful, the process 1400 can return to block 1406 and repeat blocks 1406 and 1408 to calculate the pose of the camera based on the features detected in the newly captured frame. In some cases, if the process 1400 determines that the pose calculation at block 1408 was not successful, the process can 1400 can continue to iteratively attempt to calculate the pose based on additional captured frames. In some cases, at block 1412, if the process 1400 is unable to successfully calculate the pose after N iterations (e.g., N frames), the process can proceed to block 1428. At block 1428, the process 1400 can determine that a localization (or tracking) operation of the SLAM system has failed. In some cases, the process 1400 can replace the map or a subset of the map. In one illustrative example, process 1400 can initialize a new map (or subset of the map, such as a map slice) and resume performing SLAM (e.g., by returning to block 1402) using information stored in the new map or subset of the map.

If at block 1410 the process 1400 determines that the pose calculation was successful, the process 1400 can proceed to block 1416 and block 1414. In some cases, at block 1414, the process 1400 can update an EKF based on the newly calculated pose information. In some cases, as shown in FIG. 14, the EKF update at block 1414 can occur in parallel to the process proceeding to block 1416. In some implementations, the EKF update at block 1414 can occur in series with block 1416. In addition, block 1414 can occur before or after block 1416 without departing from the scope of the present disclosure.

At block 1416, the process 1400 can determine whether the captured frame includes new features that require updating in the map. In some cases, process 1400 can mask the tracked features prior to determining whether the captured frame includes new features. In one illustrative example, the process 1400 can mask dynamic objects such as images on a display screen or objects that are in motion within the scene before determining whether there are new features.

At block 1418, the process 1400 can determine whether to mark the captured frame as a keyframe for inclusion in the map. For example, if the process 1400 determines that a large number of features in the captured frame are new, the captured frame can be marked as a keyframe. In one illustrative example, a frame can be marked as a keyframe if more than 10% of the features detected in the captured frame are new, or any other desired threshold percentage of the features detected in the captured frame are new. In another illustrative example, a frame can be marked as a keyframe if a threshold number of new features are detected. For example, the process 1400 can mark a keyframe if there are more than 50 new features, more than 100 new features, or more than any other desired threshold number of features. If the process 1400 marks the captured frame as a keyframe, the process 1400 can proceed to block 1420. If the captured frame is not marked as a keyframe, updating the map can be bypassed and the process 1400 can forego blocks 1420 through 1422.

At block 1420, the process 1400 can extract feature descriptors for the features in the newly captured image. In some cases, the process 1400 can perform feature detection using a targeted scale space search as shown in FIG. 10A and FIG. 10B. In some cases, the closest (or nearest) scale layer (e.g., the DoG array 1004 shown in FIG. 10A) for the targeted scale space search can be determined from the metric scale of the features stored in the map slice and the distance information obtained for the features in the captured frame. For example, the metric scale and distance information can be used to determine the estimated feature scale for the feature and the closest scale layer can be selected based on the estimated feature scale. In some cases, after determining the feature locations and scale, the process 1400 can determine feature descriptors for each of the detected features.

At block 1422, the process 1400 can extract the metric scale information for the features in the keyframe for inclusion in the map data. In some cases, the process 1400 can utilize the blob size for each feature determined at block 1420 to extract the metric scale. For example, the blob size of the features determined at block 1420 using the targeted scale space search and the detected distance of the feature can be applied in Equation (1) to determine the metric scale for each feature.

At block 1424, process 1400 can generate a new keyframe. In some cases, the new keyframe can include the keypoints, dominant orientation, descriptors, metric scale, additional information associated with the features, or any combination thereof for each of the detected features.

At block 1426, the process 1400 can update the map with the new keyframe. In some cases, the process 1400 can provide the new keyframe to a mapper included in the SLAM system and the mapper can update the map based on feature information contained in the new keyframe.

Figure 15:
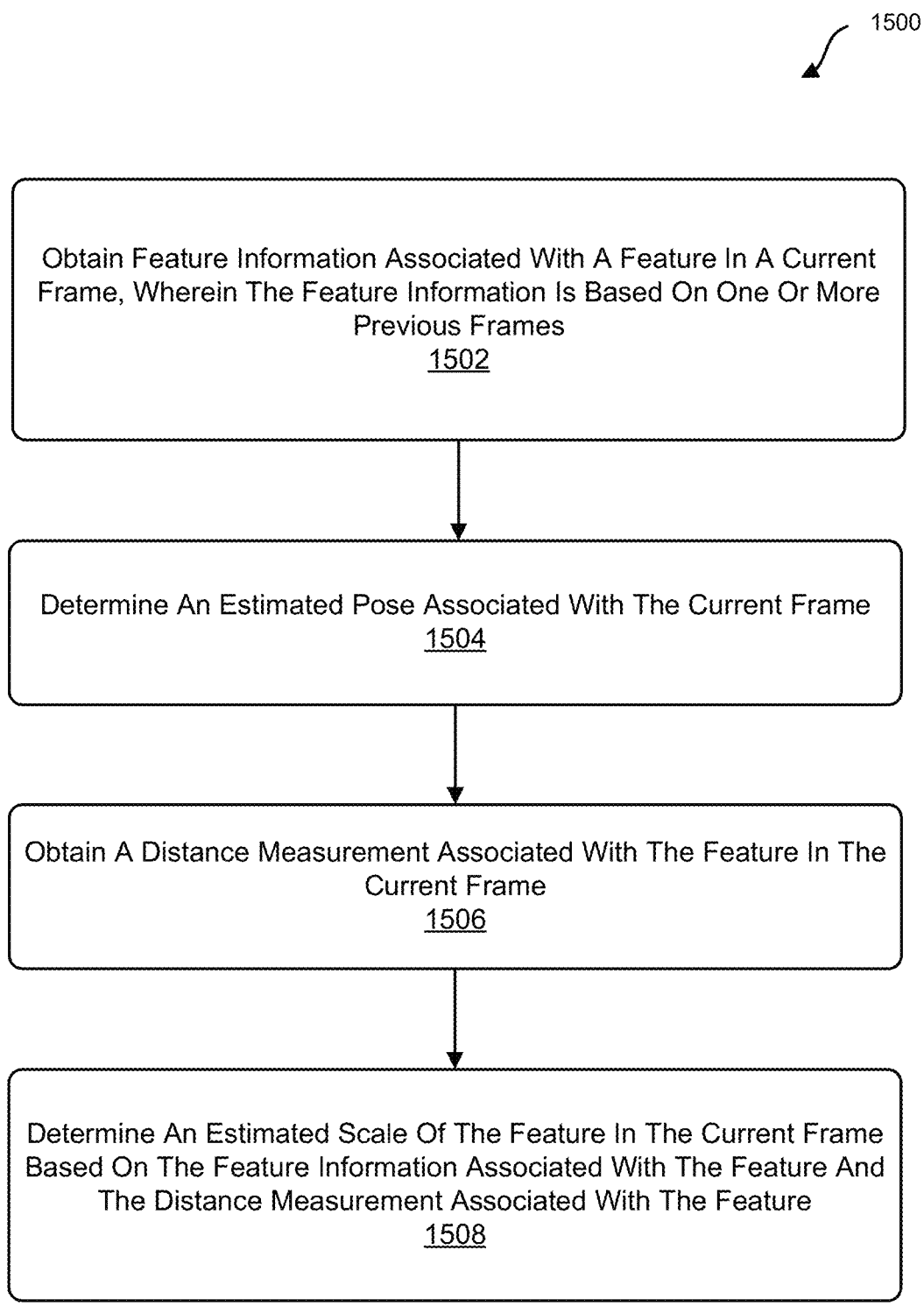
FIG. 15 is a flow diagram illustrating an example of a frame processing technique, in accordance with some examples.

FIG. 15 is a flow diagram illustrating an example of a process 1500 for processing one or more frames using one or more techniques described herein. The process can be performed by a computing device, as described below. At block 1502, the process 1500 includes obtaining feature information associated with a feature in a current frame. The feature information is based on one or more previous frames. In some cases, the one or more previous frames includes a keyframe.

At block 1504, the process 1500 includes determining an estimated pose of the computing device associated with the current frame. The pose of the computing device represents the pose of the computing device with respect to the scene depicted in the current frame. For instance, as described above with respect to FIG. 3, the SLAM system 300 can obtain a pose 385 of the SLAM system 300 and/or the camera(s) 310 during capture of a keyframe. Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). Referring to FIG. 2 as an illustrative example, the output of one or more sensors (e.g., the accelerometer 204, the gyroscope 206, one or more IMUs, and/or other sensors) can be used by the XR engine 220 to determine a pose of the XR system 200 and/or the pose of the image sensor 202 (or other camera of the XR system 200). A device tracker can use the measurements from the one or more sensors and image data from the image sensor 202 to track a pose (e.g., a 6DoF pose) of the XR system 200.

At block 1506, the process 1500 includes obtaining a distance (also referred to as a distance measurement or depth measurement) associated with the feature in the current frame. The distance can include a depth of the feature from an image sensor or camera used to capture the current frame (e.g., an image sensor or camera of the computing device). For example, as described above with respect to FIG. 4B, in some examples, the XR system can estimate depth by performing triangulation or other technique on map points. Based on the triangulation, the XR device or system can estimate the distance or depth. In some examples, a separate sensor (e.g., a depth sensor) can capture depth measurements simultaneously or in close temporal proximity (e.g., within 1 ms, within 10 ms, or within any other desired time threshold) with capturing image frames.

At block 1508, the process 1500 includes determining an estimated scale of the feature in the current frame based on the feature information associated with the feature, the estimated pose, and the distance associated with the feature. In some examples, the feature information includes a metric scale of the feature. Additionally or alternatively, in some examples, the feature information includes a previous distance and a previous feature scale of the feature associated with the one or more previous frames.

In some examples, the process 1500 includes determining an estimated location of the feature in the current frame based on a location of the feature in the one or more previous frames and the estimated pose associated with the current frame. The process 1500 can include obtaining the distance associated with the current frame at the estimated location of the feature. In some cases, to determine the estimated location of the feature in the current frame based on the estimated pose, the process 1500 can include obtaining motion information from a motion sensor. Based on the motion information, the process 1500 can include updating a previously determined pose. In some aspects, the motion sensor includes an inertial measurement unit (IMU). In some cases, the computing device includes the motion sensor (e.g., the IMU).

In some examples, the process 1500 includes determining a location of the feature in the current frame and a calculated scale of the feature in the current frame based on matching the feature in the current frame with a feature associated with the one or more previous frames. In some cases, the process 1500 includes determining a location of the feature in the current frame and a calculated scale of the feature in the current frame based on the estimated scale of the feature. For instance, the process 1500 can include searching for the feature in a nearest scale space layer of a scale space. A scale of the nearest scale space layer corresponds to the estimated scale of the feature. In some examples, the scale space includes a plurality of filtered arrays based on the current frame. In some cases, each of the plurality of filtered arrays based on the current frame is associated with a different feature scale. Additionally or alternatively, in some aspects, the scale space includes a plurality of difference of gaussian (DoG) arrays associated with different feature scales. For instance, the plurality of DOG arrays can include the nearest scale space layer of the scale space. Additionally or alternatively, in some aspects, the scale space includes a plurality of Laplacian of Gaussian arrays associated with different feature scales. In some aspects, the process 1500 includes searching for the feature in one or more scale space layers neighboring the nearest scale space layer of the scale space.

In some cases, the scale space includes N scale space layers. In some cases, the process 1500 includes searching for the feature in less than N layers of the scale space.

In some examples, the process 1500 can additionally or alternatively (e.g., as an alternative to determining the estimated scale of the feature in the current frame based on the feature information and the distance) include determining an estimated dominant orientation of the feature in the current frame based on the feature information associated with the feature, the estimated pose of the computing device associated with the current frame, and the distance associated with the feature. For example, the feature information may include a previous dominant orientation associated with the feature based on the one or more previous frames. In such an example, to determine the estimated dominant orientation of the feature in the current frame, the process 1500 can include determining an estimated transformation between a pose associated with the one or more previous frames and the estimated pose associated with the current frame. The process 1500 can further include applying the estimated transformation to the previous dominant orientation to determine the estimated dominant orientation of the feature in the current frame.

The process 1500 illustrated in FIG. 15 may also include any operation discussed illustrated in, or discussed with respect to, the image capture and processing system 100, the image capture device 105A, the image processing device 105B, the XR system, the SLAM system 300, or a combination thereof. The image processing technique of FIG. 15 may represent at least some of the operations of an image capture and processing system 100, an image capture device 105A, an image processing device 105B, an XR system 200, a SLAM system 300, a computing system 1600, or a combination thereof.

In some cases, at least a subset of the techniques illustrated by the process 1500 may be performed remotely by one or more network servers of a cloud service. In some examples, the processes described herein (e.g., processes 1300, 1400, 1500 and/or other process(es) described herein) may be performed by a computing device or apparatus. In some examples, the process 1500 can be performed by the image capture device 105A of FIG. 1. In some examples, the process 1500 can be performed by the image processing device 105B of FIG. 1. The process 1500 can also be performed by the image capture and processing system 100 of FIG. 1. The process 1500 can also be performed by the XR device of FIG. 2, the SLAM system 300 of FIG. 3, a variation thereof, or a combination thereof. The process 1500 can also be performed by a computing device with the architecture of the computing system 1600 shown in FIG. 16. The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the process 1500. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

Figure 16:
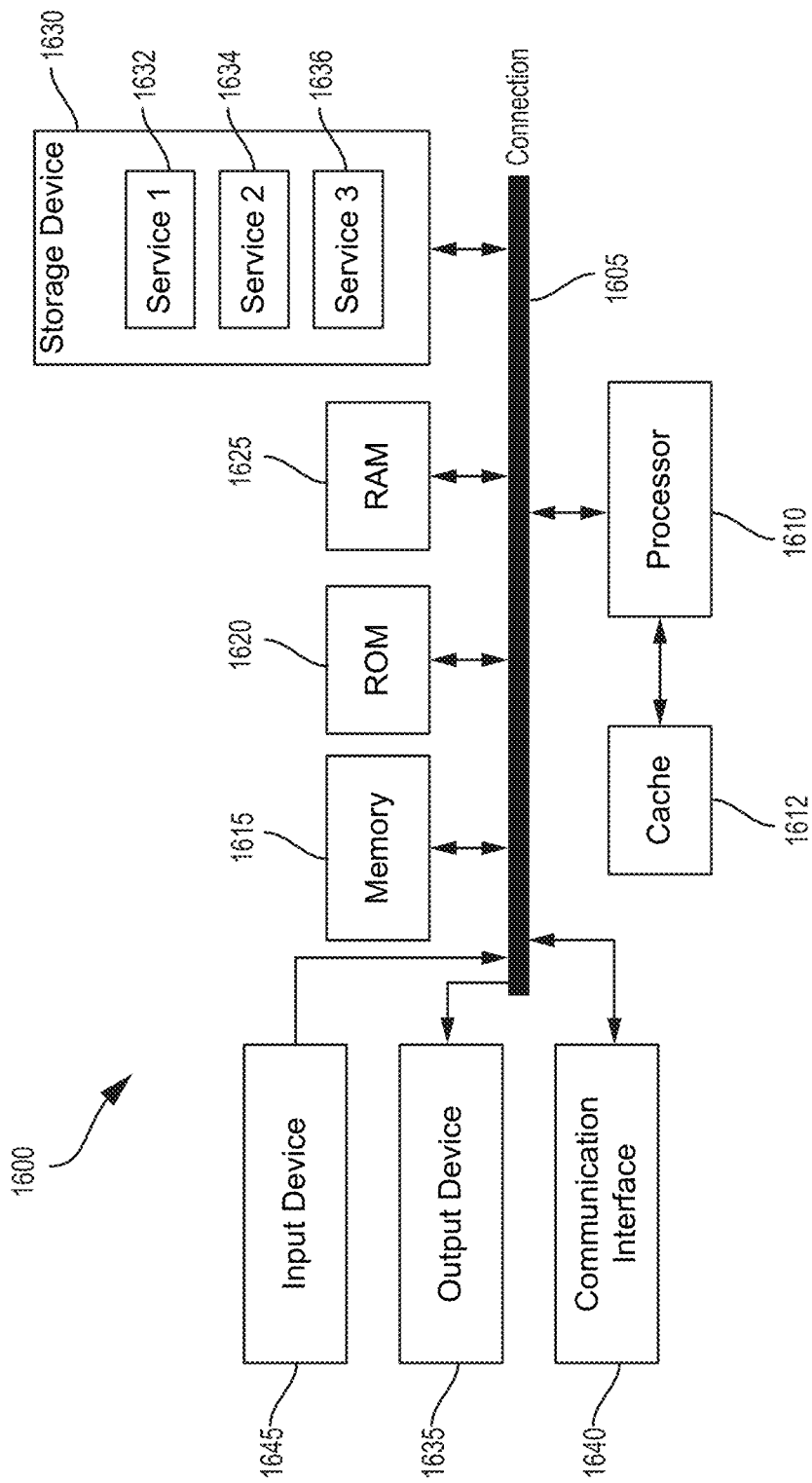
FIG. 16 is a diagram illustrating an example of a system for implementing certain aspects of the present technology.

The processes illustrated by block diagrams in FIG. 1 (of image capture and processing system 100), FIG. 2 (of XR system 200), FIG. 3 (of SLAM system 300), and FIG. 16 (of system 1600) and the flow diagrams illustrating processes 1300, 1400, 1500 are illustrative of, or organized as, logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes illustrated by block diagrams illustrating image capture and processing system 100, XR system 200, SLAM system 300, and computing system 1600 and the flow diagrams illustrating processes 1300, 1400, 1500 and/or other processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 16 is a diagram illustrating an example of a system for implementing certain aspects of the present technology. In particular, FIG. 16 illustrates an example of computing system 1600, which can be for example any computing device making up the image capture and processing system 100, the image capture device 105A, the image processing device 105B, the XR system, the SLAM system 300, a remote computing system, or any component thereof in which the components of the system are in communication with each other using connection 1605. Connection 1605 can be a physical connection using a bus, or a direct connection into processor 1610, such as in a chipset architecture. Connection 1605 can also be a virtual connection, networked connection, or logical connection.

In some embodiments, computing system 1600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1600 includes at least one processing unit (CPU or processor) 1610 and connection 1605 that couples various system components including system memory 1615, such as read-only memory (ROM) 1620 and random access memory (RAM) 1625 to processor 1610. Computing system 1600 can include a cache 1612 of high-speed memory connected directly with, in close proximity to, or integrated as part of processor 1610.

Processor 1610 can include any general purpose processor and a hardware service or software service, such as services 1632, 1634, and 1636 stored in storage device 1630, configured to control processor 1610 as well as a special-purpose processor where software instructions are incorporated into the actual processor design. Processor 1610 may essentially be a completely self-contained computing system, containing multiple cores or processors, a bus, memory controller, cache, etc. A multi-core processor may be symmetric or asymmetric.

To enable user interaction, computing system 1600 includes an input device 1645, which can represent any number of input mechanisms, such as a microphone for speech, a touch-sensitive screen for gesture or graphical input, keyboard, mouse, motion input, speech, etc. Computing system 1600 can also include output device 1635, which can be one or more of a number of output mechanisms. In some instances, multimodal systems can enable a user to provide multiple types of input/output to communicate with computing system 1600. Computing system 1600 can include communications interface 1640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON®; wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1640 may also include one or more Global Navigation Satellite System (GNSS) receivers or transceivers that are used to determine a location of the computing system 1600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick R card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1630 can include software services, servers, services, etc., that when the code that defines such software is executed by the processor 1610, it causes the system to perform a function. In some embodiments, a hardware service that performs a particular function can include the software component stored in a computer-readable medium in connection with the necessary hardware components, such as processor 1610, connection 1605, output device 1635, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic array's (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for processing one or more frames, the apparatus comprising: a memory; and one or more processors coupled to the memory, the one or more processors configured to: obtain feature information associated with a feature in a current frame, wherein the feature information is based on one or more previous frames; determine an estimated pose of the apparatus associated with the current frame; obtain a distance associated with the feature in the current frame; and determine an estimated scale of the feature in the current frame based on the feature information associated with the feature, the estimated pose, and the distance associated with the feature.

Aspect 2: The apparatus of Aspect 1, wherein the one or more processors are configured to: determine an estimated location of the feature in the current frame based on a location of the feature in the one or more previous frames and the estimated pose associated with the current frame; and obtain the distance associated with the current frame at the estimated location of the feature.

Aspect 3: The apparatus of Aspect 2, wherein, to determine the estimated location of the feature in the current frame based on the estimated pose, the one or more processors are configured to: obtain motion information from a motion sensor; and based on the motion information, update a previously determined pose.

Aspect 4: The apparatus of Aspect 3, wherein the motion sensor comprises an inertial measurement unit.

Aspect 5: The apparatus of any of Aspects 2 or 3, further comprising the motion sensor.

Aspect 6: The apparatus of any of Aspects 1 to 5, wherein the feature information comprises a metric scale of the feature.

Aspect 7: The apparatus of any of Aspects 1 to 6, wherein the feature information comprises a previous distance and a previous feature scale of the feature associated with the one or more previous frames.

Aspect 8: The apparatus of any of Aspects 1 to 7, wherein the one or more previous frames comprises a keyframe.

Aspect 9: The apparatus of any of Aspects 1 to 8, wherein the one or more processors are configured to: determine a location of the feature in the current frame and a calculated scale of the feature in the current frame based on matching the feature in the current frame with a feature associated with the one or more previous frames.

Aspect 10: The apparatus of any of Aspects 1 to 9, wherein the one or more processors are configured to: determine a location of the feature in the current frame and a calculated scale of the feature in the current frame based on the estimated scale of the feature at least in part by searching for the feature in a nearest scale space layer of a scale space, wherein a scale of the nearest scale space layer corresponds to the estimated scale of the feature.

Aspect 11: The apparatus of Aspect 10, wherein the scale space comprises a plurality of filtered arrays based on the current frame, wherein each of the plurality of filtered arrays based on the current frame is associated with a different feature scale.

Aspect 12: The apparatus of any of Aspects 10 or 11, wherein the scale space comprises a plurality of difference of gaussian (DoG) arrays associated with different feature scales, and wherein the plurality of DOG arrays comprises the nearest scale space layer of the scale space.

Aspect 13: The apparatus of any of Aspects 10 to 12, wherein the scale space comprises a plurality of Laplacian of Gaussian arrays associated with different feature scales.

Aspect 14: The apparatus of any of Aspects 10 to 13, wherein the one or more processors are configured to: search for the feature in one or more scale space layers neighboring the nearest scale space layer of the scale space.

Aspect 15: The apparatus of any of Aspects 10 to 14, wherein: the scale space comprises N scale space layers; and the one or more processors are configured to search for the feature in less than N layers of the scale space.

Aspect 16: The apparatus of any of Aspects 1 to 15, wherein, to obtain the distance associated with the feature in the current frame, the one or more processors are configured to perform triangulation using one or more map points corresponding to an environment associated with the current frame.

Aspect 17: The apparatus of any of Aspects 1 to 15, wherein, to obtain the distance associated with the feature in the current frame, the one or more processors are configured to receive one or more depth measurements from a depth sensor.

Aspect 18: A method of processing one or more frames, comprising: obtaining, by a computing device, feature information associated with a feature in a current frame, wherein the feature information is based on one or more previous frames; determining, by the computing device, an estimated pose of the computing device associated with the current frame; obtaining a distance associated with the feature in the current frame; and determining, by the computing device, an estimated scale of the feature in the current frame based on the feature information associated with the feature, the estimated pose, and the distance associated with the feature.

Aspect 19: The method of Aspect 18, further comprising: determining an estimated location of the feature in the current frame based on a location of the feature in the one or more previous frames and the estimated pose associated with the current frame; and obtaining the distance associated with the current frame at the estimated location of the feature.

Aspect 20: The method of Aspect 19, wherein determining the estimated location of the feature in the current frame based on the estimated pose includes: obtaining motion information from a motion sensor; and based on the motion information, updating a previously determined pose.

Aspect 21: The method of Aspect 20, wherein the motion sensor comprises an inertial measurement unit.

Aspect 22: The method of any of Aspects 18 to 21, wherein the feature information comprises a metric scale of the feature.

Aspect 23: The method of any of Aspects 18 to 22, wherein the feature information comprises a previous distance and a previous feature scale of the feature associated with the one or more previous frames.

Aspect 24: The method of any of Aspects 18 to 23, wherein the one or more previous frames comprises a keyframe.

Aspect 25: The method of any of Aspects 18 to 24, further comprising: determining a location of the feature in the current frame and a calculated scale of the feature in the current frame based on matching the feature in the current frame with a feature associated with the one or more previous frames.

Aspect 26: The method of any of Aspects 18 to 25, further comprising: determining a location of a feature in the current frame and a calculated scale of the feature in the current frame based on the estimated scale of the feature at least in part by searching for the feature in a nearest scale space layer of a scale space, wherein a scale of the nearest scale space layer corresponds to the estimated scale of the feature.

Aspect 27: The method of Aspect 26, wherein the scale space comprises a plurality of filtered arrays based on the current frame, wherein each of the plurality of filtered arrays based on the current frame is associated with a different feature scale.

Aspect 28: The method of any of Aspects 26 or 27, wherein the scale space comprises a plurality of difference of gaussian (DoG) arrays associated with different feature scales, and wherein the plurality of DoG arrays comprises the nearest scale space layer of the scale space.

Aspect 29: The method of any of Aspects 26 to 28, wherein the scale space comprises a plurality of Laplacian of Gaussian arrays associated with different feature scales.

Aspect 30: The method of any of Aspects 26 to 29, further comprising: searching for the feature in one or more scale space layers neighboring the nearest scale space layer of the scale space.

Aspect 31: The method of any of Aspects 26 to 30, wherein: the scale space comprises N scale space layers; and the one or more processors are configured to search for the feature in less than N layers of the scale space.

Aspect 32: The apparatus of any of Aspects 18 to 31, wherein, to obtain the distance associated with the feature in the current frame, the one or more processors are configured to perform triangulation using one or more map points corresponding to an environment associated with the current frame.

Aspect 33: The apparatus of any of Aspects 18 to 31, wherein, to obtain the distance associated with the feature in the current frame, the one or more processors are configured to receive one or more depth measurements from a depth sensor.

Aspect 34: A non-transitory computer-readable storage medium having stored thereon instructions which, when executed by one or more processors, cause the one or more processors to perform any of the operations of aspects 1 to 33.

Aspect 35: An apparatus comprising means for performing any of the operations of aspects 1 to 33.

Aspect 36: An apparatus for processing one or more frames, the apparatus comprising: a memory; and one or more processors coupled to the memory, the one or more processors configured to: obtain feature information associated with a feature in a current frame, wherein the feature information is based on one or more previous frames; determine an estimated pose of the apparatus associated with the current frame; obtain a distance associated with the feature in the current frame; and determine an estimated dominant orientation of the feature in the current frame based on the feature information associated with the feature, the estimated pose, and the distance associated with the feature.

Aspect 37: The apparatus of Aspect 36, wherein the feature information includes a previous dominant orientation associated with the feature based on the one or more previous frames, and wherein, to determine the estimated dominant orientation of the feature in the current frame, the one or more processors are configured to: determine an estimated transformation between a pose associated with the one or more previous frames and the estimated pose associated with the current frame; and apply the estimated transformation to the previous dominant orientation to determine the estimated dominant orientation of the feature in the current frame.

Aspect 38: A method of processing one or more frames, comprising: obtaining, by a computing device, feature information associated with a feature in a current frame, wherein the feature information is based on one or more previous frames; determining an estimated pose of the computing device associated with the current frame; obtaining, by the computing device, a distance associated with the feature in the current frame; and determining, by the computing device, an estimated dominant orientation of the feature in the current frame based on the feature information associated with the feature, the estimated pose, and the distance associated with the feature.

Aspect 39: The method of Aspect 38, wherein the feature information includes a previous dominant orientation associated with the feature based on the one or more previous frames, and wherein, to determine the estimated dominant orientation of the feature in the current frame, the method further comprising: determining an estimated transformation between a pose associated with the one or more previous frames and the estimated pose associated with the current frame; and applying the estimated transformation to the previous dominant orientation to determine the estimated dominant orientation of the feature in the current frame.

Aspect 40: A non-transitory computer-readable storage medium having stored thereon instructions which, when executed by one or more processors, cause the one or more processors to perform any of the operations of aspects 36 to 39.

Aspect 41: An apparatus comprising means for performing any of the operations of aspects 36 to 39.

Aspect 42: A method comprising operations according to any of Aspects 1 to 33 and any of Aspects 36 to 39.

Aspect 43: An apparatus for processing one or more frames. The apparatus includes at least one memory (e.g., implemented in circuitry) configured to store one or more frames and one or more processors (e.g., one processor or multiple processors) coupled to the at least one memory. The one or more processors are configured to perform operations according to any of Aspects 1 to 33 and any of Aspects 36 to 39.

Aspect 44: A computer-readable storage medium storing instructions that, when executed by one or more processors, cause the one or more processors to perform operations according to any of Aspects 1 to 33 and any of Aspects 36 to 39.

Aspect 45: An apparatus comprising means for performing operations according to any of Aspects 1 to 33 and any of Aspects 36 to 39.

What is claimed is:

1. An apparatus for processing one or more frames, the apparatus comprising:
a memory; and
one or more processors coupled to the memory, the one or more processors configured to:
determine, based on pixel values of a current frame obtained from an image sensor, a location of a feature in the current frame;
obtain feature information associated with the feature in the current frame, wherein the feature information is based on one or more previous frames;
determine an estimated pose of the apparatus associated with the current frame;
obtain, from a depth sensor, a distance associated with the feature in the current frame;
determine an estimated scale of the feature in the current frame based on the feature information associated with the feature, the estimated pose, and the distance associated with the feature;
determine, based on the estimated scale of the feature, a nearest scale space layer associated with the feature, wherein a scale space comprises a plurality of scale space layers associated with different feature scales, the plurality of scale space layers comprising the nearest scale space layer; and
determine, based on searching for an additional feature corresponding to the feature in the nearest scale space layer, a scale of the feature in the current frame, wherein the determined scale is different from the estimated scale.

2. The apparatus of claim 1, wherein the one or more processors are configured to:
determine an estimated location of the feature in the current frame based on a location of the feature in the one or more previous frames and the estimated pose associated with the current frame; and
obtain the distance associated with the current frame at the estimated location of the feature.

3. The apparatus of claim 2, wherein, to determine the estimated location of the feature in the current frame based on the estimated pose, the one or more processors are configured to:
obtain motion information from a motion sensor; and
based on the motion information, update a previously determined pose.

4. The apparatus of claim 3, wherein the motion sensor comprises an inertial measurement unit.

5. The apparatus of claim 3, further comprising the motion sensor.

6. The apparatus of claim 1, wherein the feature information comprises a metric scale of the feature.

7. The apparatus of claim 1, wherein the feature information comprises a previous distance and a previous feature scale of the feature associated with the one or more previous frames.

8. The apparatus of claim 1, wherein the one or more previous frames comprises a keyframe.

9. The apparatus of claim 1, wherein the one or more processors are configured to:
determine a location of the feature in the current frame and a calculated scale of the feature in the current frame based on matching the feature in the current frame with a feature associated with the one or more previous frames.

10. The apparatus of claim 1, wherein the scale space comprises a plurality of filtered arrays based on the current frame, wherein each of the plurality of filtered arrays based on the current frame is associated with a different feature scale.

11. The apparatus of claim 1, wherein the scale space comprises a plurality of difference of gaussian (DoG) arrays associated with different feature scales, and wherein the plurality of DoG arrays comprises the nearest scale space layer of the scale space.

12. The apparatus of claim 11, wherein the scale space comprises a plurality of Laplacian of Gaussian arrays associated with different feature scales.

13. The apparatus of claim 1, wherein the one or more processors are configured to:
search for the feature in one or more scale space layers neighboring the nearest scale space layer of the scale space.

14. The apparatus of claim 1, wherein:
the scale space comprises N scale space layers; and
the one or more processors are configured to search for the feature in less than N layers of the scale space.

15. The apparatus of claim 1, wherein, to determine, based on searching for the additional feature corresponding to the feature in the nearest scale space layer, the scale of the feature in the current frame, the one or more processors are further configured to:
- determine a dominant orientation of the feature; and
- compare the dominant orientation of the feature with an additional dominant orientation of the additional feature.

16. A method of processing one or more frames, comprising:
- determining, based on pixel values of a current frame obtained from an image sensor, a location of a feature in the current frame;
- obtaining, by a computing device, feature information associated with the feature in the current frame, wherein the feature information is based on one or more previous frames;
- determining an estimated pose of the computing device associated with the current frame;
- obtaining, from a depth sensor, a distance associated with the feature in the current frame;
- determining, by the computing device, an estimated scale of the feature in the current frame based on the feature information associated with the feature, the estimated pose, and the distance associated with the feature;
- determining, based on the estimated scale of the feature, a nearest scale space layer associated with the feature, wherein a scale space comprises a plurality of scale space layers associated with different feature scales, the plurality of scale space layers comprising the nearest scale space layer; and
- determining, based on searching for an additional feature corresponding to the feature in the nearest scale space layer, a scale of the feature in the current frame, wherein the determined scale is different from the estimated scale.

17. The method of claim 16, further comprising:
- determining an estimated location of the feature in the current frame based on a location of the feature in the one or more previous frames and the estimated pose associated with the current frame; and
- obtaining the distance associated with the current frame at the estimated location of the feature.

18. The method of claim 17, wherein determining the estimated location of the feature in the current frame based on the estimated pose includes:
- obtaining motion information from a motion sensor; and
- based on the motion information, updating a previously determined pose.

19. The method of claim 18, wherein the motion sensor comprises an inertial measurement unit.

20. The method of claim 16, wherein the feature information comprises a metric scale of the feature.

21. The method of claim 16, wherein the feature information comprises a previous distance and a previous feature scale of the feature associated with the one or more previous frames.

22. The method of claim 16, wherein the one or more previous frames comprises a keyframe.

23. The method of claim 16, further comprising:
- determining a location of the feature in the current frame and a calculated scale of the feature in the current frame based on matching the feature in the current frame with a feature associated with the one or more previous frames.

24. The method of claim 16, wherein the scale space comprises a plurality of filtered arrays based on the current frame, wherein each of the plurality of filtered arrays based on the current frame is associated with a different feature scale.

25. The method of claim 16, wherein the scale space comprises a plurality of difference of gaussian (DoG) arrays associated with different feature scales, and wherein the plurality of DoG arrays comprises the nearest scale space layer of the scale space.

26. The method of claim 16, further comprising:
- searching for the feature in one or more scale space layers neighboring the nearest scale space layer of the scale space.

27. The method of claim 16, wherein determining, based on searching for the additional feature corresponding to the feature in the nearest scale space layer, the scale of the feature in the current frame comprises:
- determining a dominant orientation of the feature; and
- comparing the dominant orientation of the feature with an additional dominant orientation of the additional feature.

* * * * *